US009795945B2

United States Patent
Shirakawa et al.

(10) Patent No.: US 9,795,945 B2
(45) Date of Patent: Oct. 24, 2017

(54) EXHAUST GAS PURIFICATION CATALYST AND METHOD FOR PRODUCING THE SAME

(71) Applicant: TOYOTA JIDOSHA KABUSHIKI KAISHA, Toyota-shi, Aichi-ken (JP)

(72) Inventors: Shogo Shirakawa, Gotemba (JP); Yui Kamada, Numazu (JP); Tatsuya Miyazaki, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/087,532

(22) Filed: Mar. 31, 2016

(65) Prior Publication Data

US 2016/0296912 A1  Oct. 13, 2016

(30) Foreign Application Priority Data

Apr. 8, 2015  (JP) .................. 2015-078958
Dec. 17, 2015  (JP) .................. 2015-246776

(51) Int. Cl.
*B01D 53/94*  (2006.01)
*F01N 3/08*  (2006.01)
(Continued)

(52) U.S. Cl.
CPC .......... *B01J 23/464* (2013.01); *B01D 53/945* (2013.01); *B01D 53/9422* (2013.01); *B01J 23/10* (2013.01);
(Continued)

(58) Field of Classification Search
CPC ........ B01J 21/04; B01J 21/063; B01J 21/066; B01J 21/08; B01J 21/10; B01J 21/12;
(Continued)

(56) References Cited

U.S. PATENT DOCUMENTS

| 4,274,981 A * | 6/1981 | Suzuki | B01D 53/945 423/213.5 |
| 5,071,816 A * | 12/1991 | Horiuchi | B01D 53/944 423/215.5 |
| 2012/0192550 A1 | 8/2012 | Nagata et al. | |

FOREIGN PATENT DOCUMENTS

| JP | 2002-102679 A | 4/2002 |
| JP | 2011-078857 A | 4/2011 |
| WO | 2014/169235 A1 | 10/2014 |

OTHER PUBLICATIONS

James Russell Renzas et al., Rh1-xPdx nanoparticle composition dependence in CO oxidation by oxygen: catalytic activity enhancement in bimetallic systems, Physical Chemistry Chemical Physics, vol. 13, No. 7, pp. 2556-2562. (Dec. 24, 2010).

(Continued)

*Primary Examiner* — Cam N. Nguyen
(74) *Attorney, Agent, or Firm* — Oliff PLC

(57) ABSTRACT

An object of the present invention is to provide an exhaust gas purification catalyst for purifying exhaust gas, in particular, fine composite-metal particles contained therein, and a method for producing the same; the exhaust gas purification catalyst according to the present invention includes fine composite-metal particles containing Rh and Pd, wherein, when the fine composite-metal particles in the exhaust gas purification catalyst are analyzed by STEM-EDX, the average ratio of the amount of Pd with respect to the total amount of Rh and Pd in the fine composite-metal particles is 1.7 atomic % or more and 24.8 atomic % or less.

13 Claims, 11 Drawing Sheets

(51) Int. Cl.
- F01N 3/10 (2006.01)
- F01N 3/28 (2006.01)
- B01J 21/04 (2006.01)
- B01J 21/06 (2006.01)
- B01J 21/08 (2006.01)
- B01J 21/10 (2006.01)
- B01J 21/12 (2006.01)
- B01J 21/14 (2006.01)
- B01J 23/10 (2006.01)
- B01J 23/44 (2006.01)
- B01J 23/56 (2006.01)
- B01J 23/63 (2006.01)
- B01J 35/00 (2006.01)
- B01J 35/02 (2006.01)
- B01J 23/46 (2006.01)
- B01J 37/16 (2006.01)
- B01J 23/58 (2006.01)
- B01J 37/02 (2006.01)

(52) U.S. Cl.
CPC ............... *B01J 23/58* (2013.01); *B01J 23/63* (2013.01); *B01J 35/002* (2013.01); *B01J 35/006* (2013.01); *B01J 35/0013* (2013.01); *B01J 35/02* (2013.01); *B01J 37/0203* (2013.01); *B01J 37/024* (2013.01); *B01J 37/0211* (2013.01); *B01J 37/0213* (2013.01); *B01J 37/16* (2013.01); *F01N 3/0842* (2013.01); *F01N 3/101* (2013.01); *F01N 3/2803* (2013.01); *B01D 2255/1023* (2013.01); *B01D 2255/1025* (2013.01); *B01D 2255/2042* (2013.01); *B01D 2255/2047* (2013.01); *B01D 2255/2065* (2013.01); *B01D 2255/2092* (2013.01); *B01D 2255/20707* (2013.01); *B01D 2255/20715* (2013.01); *B01D 2255/30* (2013.01); *B01D 2255/40* (2013.01); *B01D 2255/407* (2013.01); *B01D 2255/91* (2013.01); *B01J 35/0093* (2013.01); *B01J 37/0236* (2013.01); *B01J 2523/00* (2013.01); *F01N 2370/02* (2013.01)

(58) Field of Classification Search
CPC ... B01J 21/14; B01J 23/10; B01J 23/44; B01J 23/464; B01J 23/56; B01J 23/63; B01J 35/0013; B01J 35/002; B01J 35/006; B01J 35/02; B01D 53/9422; B01D 53/945; F01N 3/0842; F01N 3/101; F01N 3/2803

See application file for complete search history.

(56) References Cited

OTHER PUBLICATIONS

James Russell Renzas et al., "Rh1-xPdx Nanoparticle Composition Dependence in CO Oxidation by NO", Catalysis Letters, Kluwer Academic Publishers-Plenum Publishers, NE, vol. 141, No. 2, pp. 235-241. (Nov. 13, 2010).

* cited by examiner

FIG. 1(a)
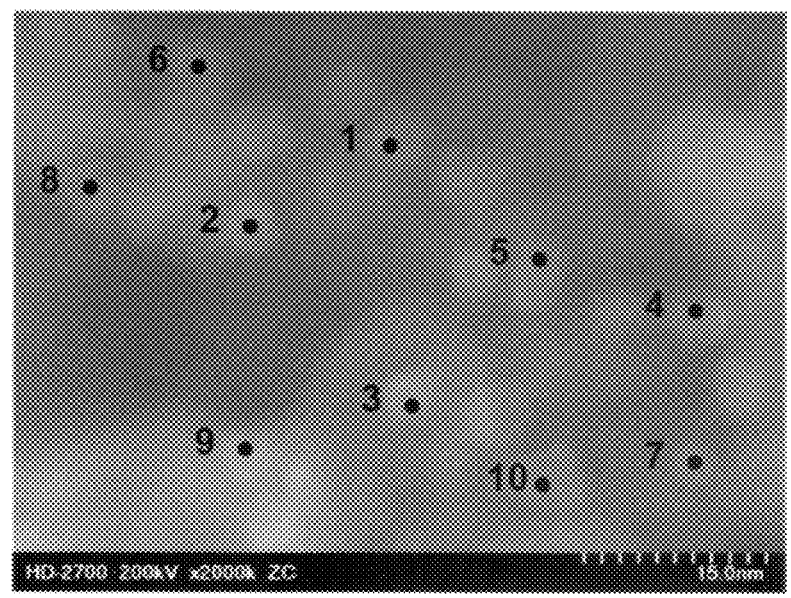
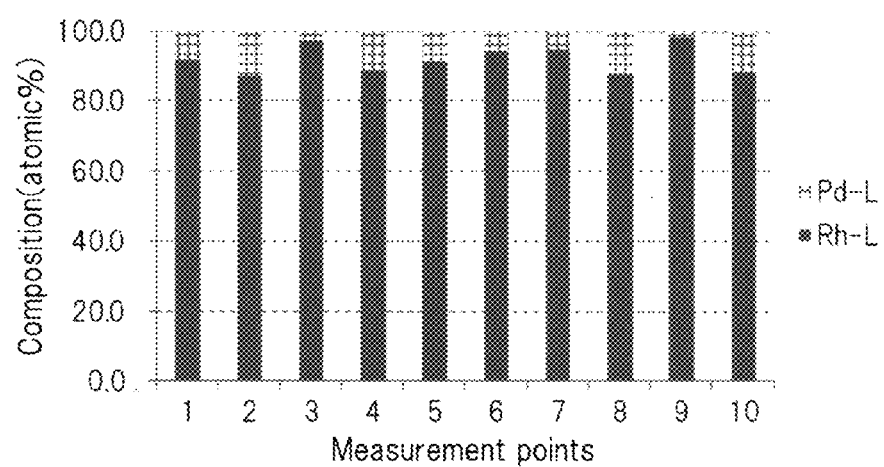
FIG. 1(b)

FIG. 2(a)
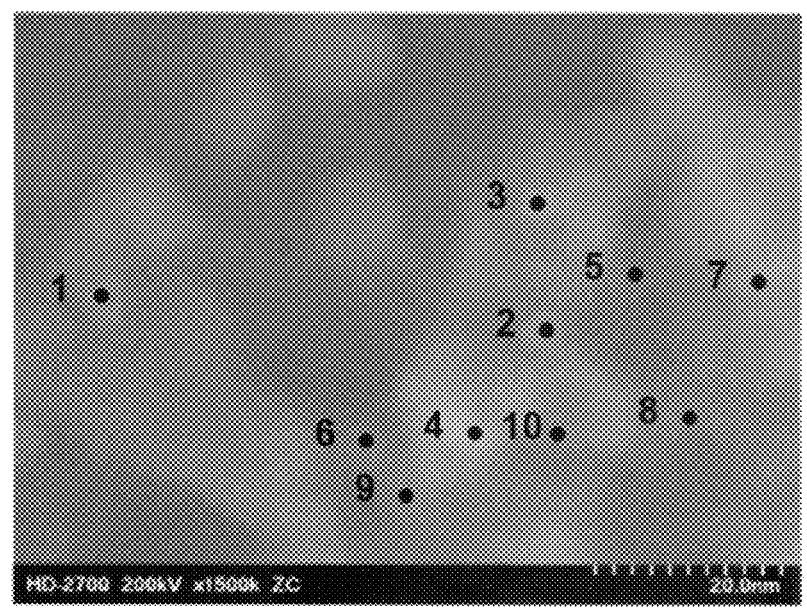
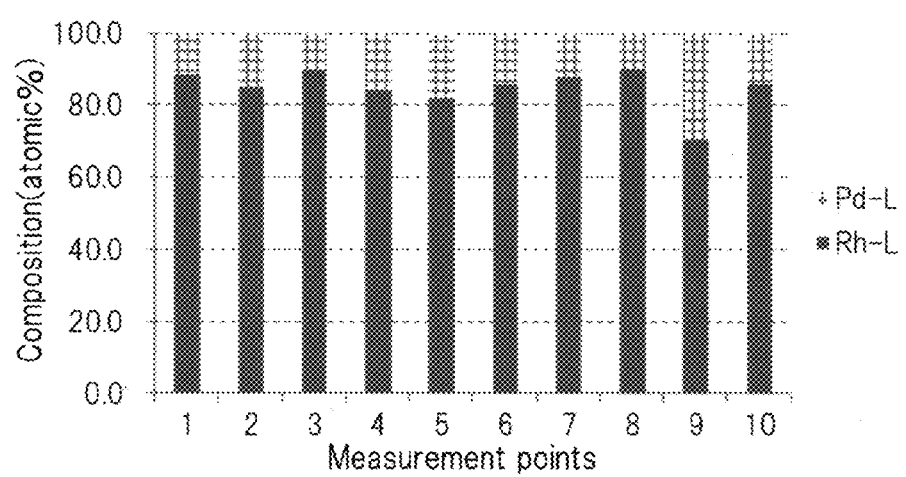
FIG. 2(b)

FIG. 3(a)
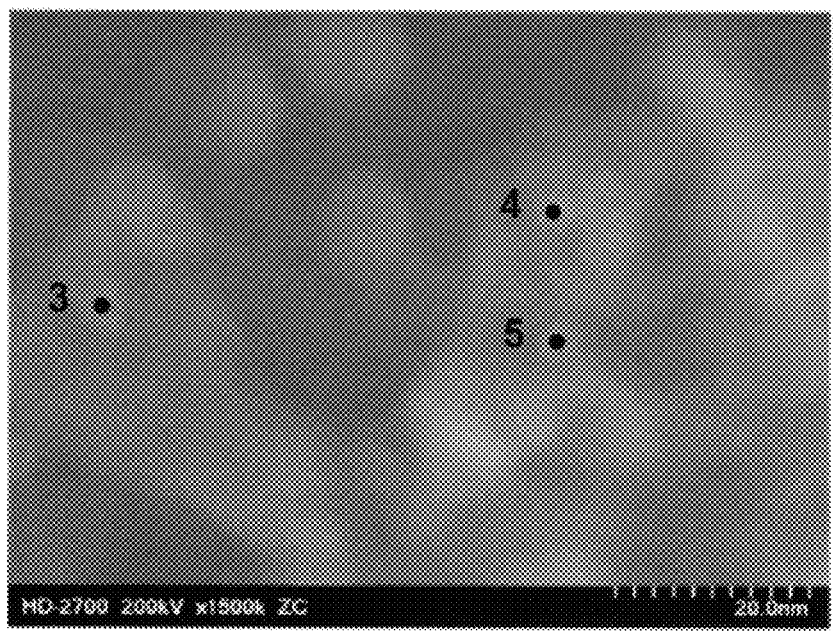
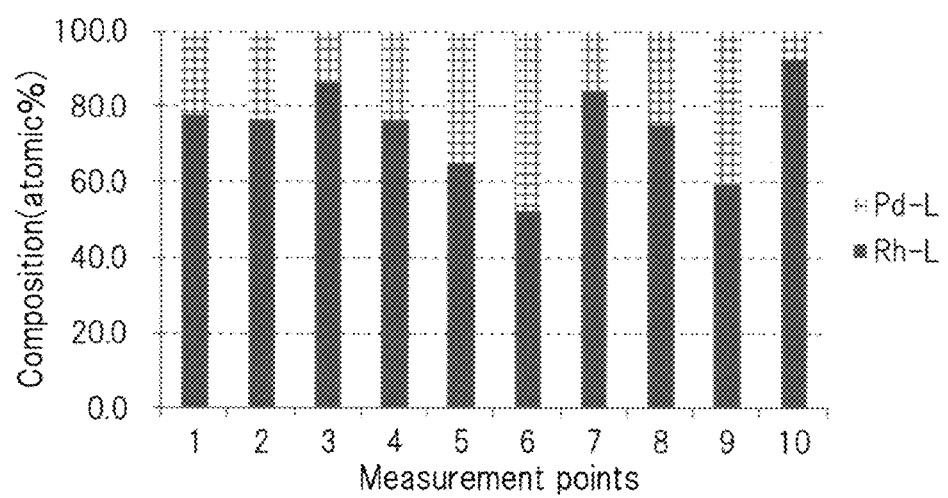
FIG. 3(b)

FIG. 4(a)
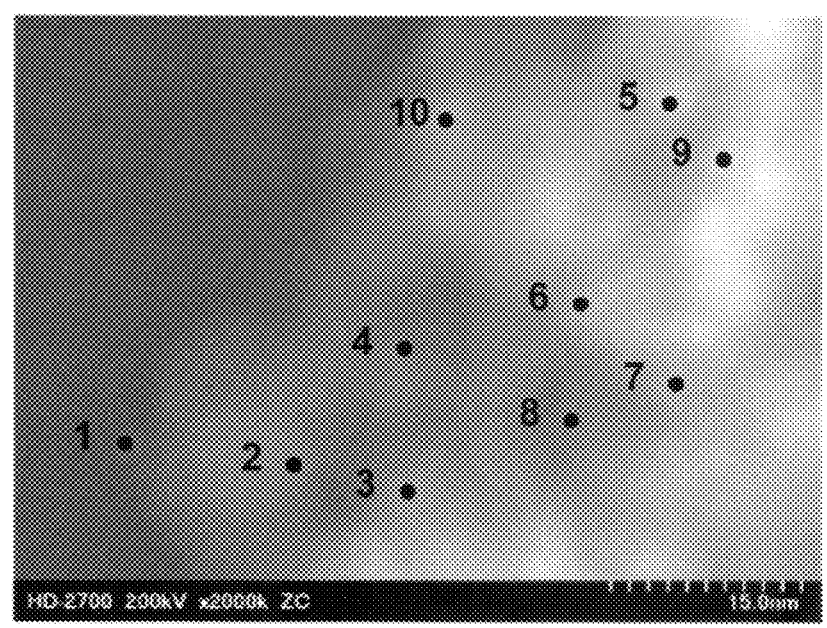
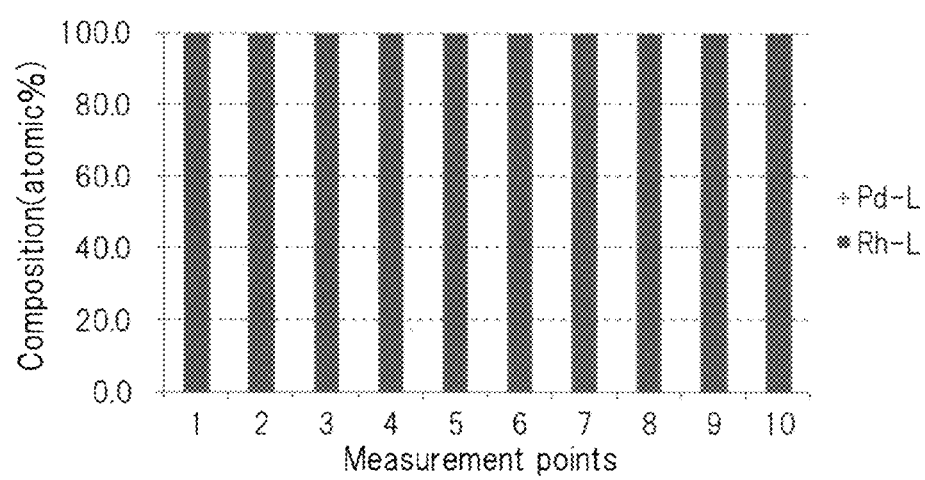
FIG. 4(b)

FIG. 5(a)
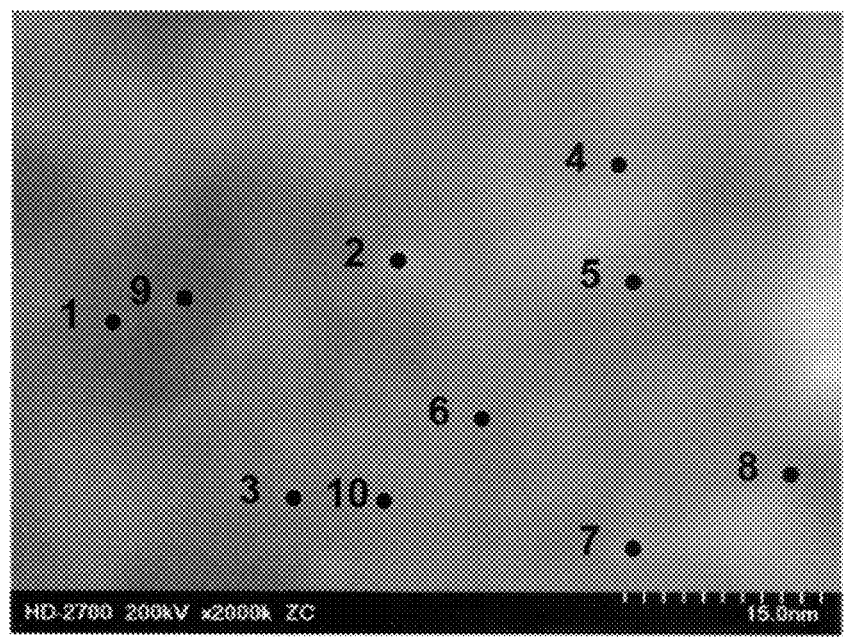
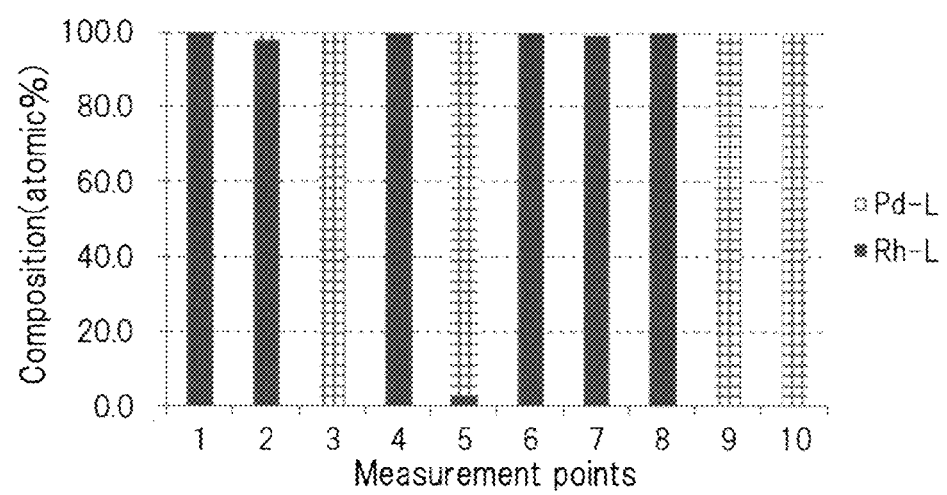
FIG. 5(b)

US 9,795,945 B2

EXHAUST GAS PURIFICATION CATALYST AND METHOD FOR PRODUCING THE SAME

TECHNICAL FIELD

The present invention relates to an exhaust gas purification catalyst and a method for producing the same. More specifically, the present invention relates to an exhaust gas purification catalyst with an improved exhaust gas purification performance, and a method for producing the same.

BACKGROUND ART

Exhaust gas emitted from internal combustion engines for automobiles and the like, for example, internal combustion engines such as gasoline engines or diesel engines, contain harmful components, such as carbon monoxide (CO), hydrocarbons (HC), nitrogen oxides (NOx), and the like.

Therefore, an internal combustion engine is typically provided with an exhaust gas purification device for decomposing and removing these harmful components, and most of the harmful components are rendered innocuous by an exhaust gas purification catalyst mounted in the exhaust gas purification device. Well-known examples of the exhaust gas purification catalyst as described above include a three-way catalyst and a NOx storage-reduction catalyst.

A three-way catalyst is a catalyst in which the oxidation of CO and HC and the reduction of NOx are carried out simultaneously in a stoichiometric (theoretical air fuel ratio) atmosphere.

A NOx storage-reduction catalyst is a catalyst which oxidizes NO in an exhaust gas to $NO_2$ and stores the $NO_2$ in a lean atmosphere, and reduces the $NO_2$ to nitrogen ($N_2$) in a stoichiometric atmosphere and a rich atmosphere, effectively utilizing the changes in the exhaust gas components in the lean atmosphere, stoichiometric atmosphere, and rich atmospheres.

However, even with the use of these catalysts, the purification of exhaust gas still remains a problem, and various techniques have been examined.

Patent Document 1 discloses a composite metal colloid containing a plurality of metal elements, wherein the average particle diameter of the composite metal colloid is from 2 to 12 nm, and the plurality of metal elements are distributed substantially uniformly in the composite metal particles. Specifically, Patent Document 1 discloses a composite metal colloid dispersion obtained by mixing a solution of palladium chloride and a solution of rhodium chloride at a molar ratio of 1:1.

Patent Document 2 discloses an exhaust gas purification catalyst for removing CO or HC, wherein the catalyst includes an alloy containing Pd and Ag, and the alloy is supported on a carrier.

PRIOR ART DOCUMENTS

Patent Documents

Patent Document 1: Japanese Unexamined Patent Publication No. 2002-102679
Patent Document 2: Japanese Unexamined Patent Publication No. 2011-78857

SUMMARY OF THE INVENTION

Problems to be Solved by the Invention

An object of the present invention is to provide an exhaust gas purification catalyst for purifying exhaust gas, particularly, fine composite-metal particles contained therein, and a method for producing the same.

Means for Solving the Problems

The present inventors have discovered that the above mentioned problems can be solved by adopting the following constitutions.

<1> An exhaust gas purification catalyst including fine composite-metal particles containing Rh and Pd;
wherein, when the fine composite-metal particles in the exhaust gas purification catalyst are analyzed by STEM-EDX, the average ratio of the amount of Pd with respect to the total amount of Rh and Pd in the fine composite-metal particles is 1.7 atomic % or more and 24.8 atomic % or less; and
wherein the average ratio is a value calculated by selecting 10 or more fine particles from the exhaust gas purification catalyst at random; measuring each of all the selected fine particles by STEM-EDX; further selecting all the fine composite-metal particles containing Rh and Pd from all the randomly selected fine particles; totaling the values of the ratio of the amount of Pd with respect to the total amount of Rh and Pd in each of the fine composite-metal particles; and dividing the total values of the ratio by the total number of the selected fine composite-metal particles.

<2> The exhaust gas purification catalyst according to item <1>, further including a powdered support, wherein the fine composite-metal particles are supported on the powdered support.

<3> The exhaust gas purification catalyst according to item <2>, wherein the powdered support is a powdered support selected from the group consisting of $SiO_2$, MgO, $ZrO_2$, $CeO_2$, $Al_2O_3$, $TiO_2$, solid solutions thereof, and combinations thereof.

<4> The exhaust gas purification catalyst according to item <2> or <3>, wherein the powdered support contains $CeO_2$ in an amount of more than 0% by mass and 40% by mass or less with respect to the mass of the powdered support.

<5> A method for purifying exhaust gas, wherein the exhaust gas purification catalyst according to any one of items <1> to <4> is brought into contact with an exhaust gas containing HC, CO and NOx, in a stoichiometric atmosphere, and thereby oxidizing HC and CO, and reducing NOx, to purify the exhaust gas.

<6> A method for purifying exhaust gas, wherein the exhaust gas purification catalyst according to any one of items <1> to <4> is brought into contact with an exhaust gas containing NOx in a lean atmosphere, and the NOx is reduced in a rich atmosphere, to purify the exhaust gas.

<7> A method for producing an exhaust gas purification catalyst, including: producing fine composite-metal particles by heating a solution containing Rh ions, Pd ions, a reducing agent, and a protecting agent to reflux;
wherein the molar ratio of the Rh ions to the Pd ions is from 70:30 to 99:1.

<8> The method according to item <7>, including supporting the fine composite-metal particles on the powdered support.

<9> The method according to item <8>, wherein the powdered support is a powdered support selected from the group consisting of $SiO_2$, MgO, $ZrO_2$, $CeO_2$, $Al_2O_3$, $TiO_2$, solid solutions thereof, and combinations thereof.

<10> The method according to item <8> or <9>, wherein the powdered support contains $CeO_2$ in an amount of more than 0% by mass and 40% by mass or less with respect to the total mass of the powdered support.

Effect of the Invention

According to the present invention, it is possible to provide an exhaust gas purification catalyst for purifying exhaust gas, in particular, fine composite-metal particles contained therein, and a method for producing the same.

BRIEF DESCRIPTION OF THE DRAWINGS

FIG. 1(a) is a STEM image of the exhaust gas purification catalyst in Example 1, obtained by analyzing the catalyst by a scanning transmission electron microscope with an energy dispersive X-ray analyzer (STEM-EDX); and FIG. 1(b) is a graph illustrating the ratio (atomic %) of the amount of Pd with respect to the total amount of Rh and Pd in each of the 10 fine particles randomly sampled from the exhaust gas purification catalyst in Example 1.

FIG. 2(a) is a STEM image of the exhaust gas purification catalyst in Example 2, obtained by analyzing the catalyst by STEM-EDX; and FIG. 2(b) is a graph illustrating the ratio (atomic %) of the amount of Pd with respect to the total amount of Rh and Pd in each of the 10 fine particles randomly sampled from the exhaust gas purification catalyst in Example 2.

FIG. 3(a) is a STEM image of the exhaust gas purification catalyst in Example 3, obtained by analyzing the catalyst by STEM-EDX; and FIG. 3(b) is a graph illustrating the ratio (atomic %) of the amount of Pd with respect to the total amount of Rh and Pd in each of the 10 fine particles randomly sampled from the exhaust gas purification catalyst in Example 3.

FIG. 4(a) is a STEM image of the exhaust gas purification catalyst in Comparative Example 1, obtained by analyzing the catalyst by STEM-EDX; and FIG. 4(b) is a graph illustrating the ratio (atomic %) of the amount of Pd with respect to the total amount of Rh and Pd in each of the 10 fine particles randomly sampled from the exhaust gas purification catalyst in Comparative Example 1.

FIG. 5(a) is a STEM image of the exhaust gas purification catalyst in Comparative Example 3, obtained by analyzing the catalyst by STEM-EDX; and FIG. 5(b) is a graph illustrating the ratio (atomic %) of the amount of Pd with respect to the total amount of Rh and Pd in each of the 10 fine particles randomly sampled from the exhaust gas purification catalyst in Comparative Example 3.

DETAILED DESCRIPTION OF THE INVENTION

Figure 6:
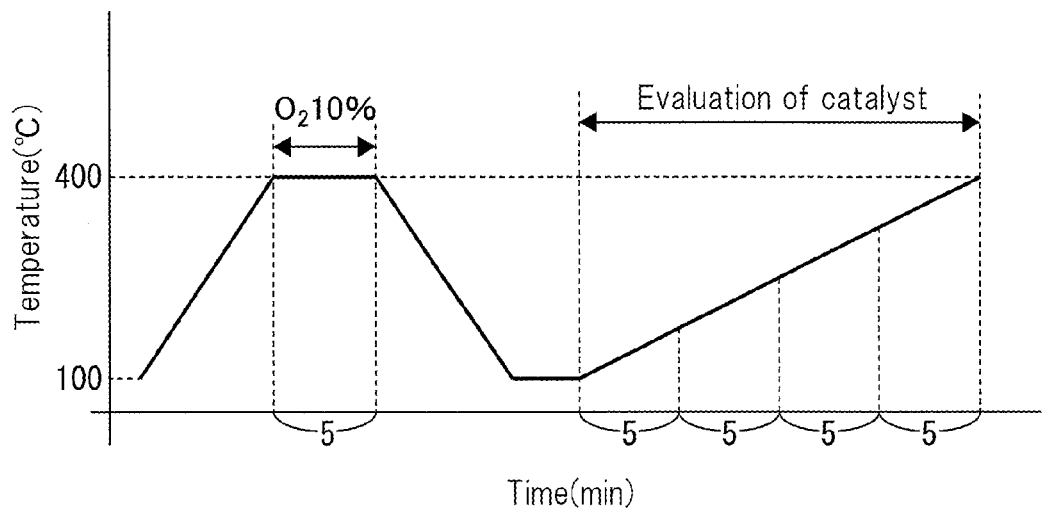
FIG. 6 is a graph illustrating the relationship between the time (min) and the temperature (° C.) regarding the conditions for evaluating three-way catalysts.

The embodiments of the present invention will now be described in detail. However, the present invention is not limited by the following embodiments, and various modifications are possible within the scope of the present invention.

<<Exhaust Gas Purification Catalyst>>

The exhaust gas purification catalyst according to the present invention includes fine composite-metal particles containing Rh and Pd, wherein, when the fine composite-metal particles in the exhaust gas purification catalyst are analyzed by STEM-EDX, the average ratio of the amount of Pd with respect to the total amount of Rh and Pd in the fine composite-metal particles is 1.7 atomic % or more and 24.8 atomic % or less.

As for a conventional exhaust gas purification catalyst, a catalyst is known in which a platinum-group element(s), such as, platinum (Pt), rhodium (Rh), palladium (Pd) and/or the like is/are supported on a porous oxide carrier, such as alumina ($Al_2O_3$).

Among the above mentioned elements, Rh has a high NOx reducing ability, and is highly valued as a catalyst metal for constituting the exhaust gas purification catalyst.

However, Rh is susceptible to oxidation, and there is a possibility that the NOx reducing ability of Rh may be decreased due to the oxidation. Therefore, an excessive amount of Rh is incorporated into the exhaust gas purification catalyst, taking the oxidation of Rh into consideration. However, since Rh is a highly valuable rare metal, excessive use of Rh is not desirable in terms of cost and environment.

Accordingly, the present inventors have focused on Pd which has a relatively low affinity for oxygen, and have developed, as a result of intensive studies, fine composite-metal particles containing Rh and Pd, in which the average ratio of the amount of Pd with respect to the total amount of Rh and Pd in the fine particles is 1.7 atomic % or more and 24.8 atomic % or less.

Since Pd inhibits the oxidation of Rh, the metallic state of Rh can be maintained for a long period of time in the fine composite-metal particles. This allows for maintaining or improving the catalyst activity of Rh, and for using Rh in an appropriate amount, even under environmental conditions, for example, conditions of gas composition, pressure, temperature and the like, where Rh is usually susceptible to oxidation.

The present inventors have also discovered that, since Pd itself also has a high exhaust gas purification ability, the fine composite-metal particles containing Rh and Pd are capable of producing a synergistic effect of purifying exhaust gas, as a result of these two kinds of metal elements being contained together.

The exhaust gas purification catalyst according to the present invention further and optionally includes a powdered support, and the fine composite-metal particles are supported on the powdered support.

When the fine composite-metal particles are supported on the powdered support, since the powdered support has a large specific surface area, the contact area between the exhaust gas and the fine composite-metal particles can be increased. This allows for improving the performance of the exhaust gas purification catalyst.

<Fine Composite-Metal Particles>

The fine composite-metal particles contain Rh and Pd.

When the particle size of the fine composite-metal particles is sufficiently small, the specific surface area is increased, which results in increasing the number of active sites for NOx on Rh and the number of active sites for NOx on Pd, potentially improving the NOx reducing ability of the exhaust gas purification catalyst.

Further, when the particle size of the fine composite-metal particles is moderately large, there is a possibility that the exhaust gas purification catalyst can fully demonstrate its NOx purification performance.

Therefore, the average particle size of a plurality of the fine composite-metal particles is not particularly limited, and may be, for example, more than 0 nm, 1 nm or more, or 2 nm or more. Further, the average particle size of the plurality of the fine composite-metal particles is not particularly limited, and may be, for example, 100 nm or less, 70 nm or less, 40 nm or less, 10 nm or less, 7 nm or less, 5 nm, 4 nm, or 3 nm or less.

Specifically, the particle size of the fine composite-metal particles is preferably in the range of from 1 nm to 10 nm, more preferably, in the range of from 2 nm to 5 nm, and still more preferably, in the range of from 2 nm to 3 nm.

By using the fine composite-metal particles having a particle size within the above mentioned range as a catalyst component, it is possible to produce fine composite-metal particles in which Rh and Pd coexist at nano-level, which in turn allows Pd to exhibit the effect of inhibiting the oxidation of Rh. Thus, an exhaust gas purification catalyst with an improved NOx purification performance can be obtained.

It is be noted that in the present invention, the "average particle size" refers to an arithmetic mean value, unless otherwise specified, obtained by measuring the equivalent circle diameters (Heywood diameter) of 10 or more randomly selected particles using a tool such as a scanning transmission electron microscope (STEM), and by calculating the arithmetic mean of the measured values.

When the average ratio of the amount of Pd with respect to the total amount of Rh and Pd in the fine composite-metal particles is sufficiently high, the effect of inhibiting the oxidation of Rh by Pd is more likely to be demonstrated. Further, when the average ratio is not too high, a sufficient number of active sites for NOx on Rh can be secured.

In particular, the average ratio of the amount of Pd with respect to the total amount of Rh and Pd in the plurality of the fine composite-metal particles may be, for example, 1.7 atomic % or more, 2 atomic % or more, 3 atomic % or more, 4 atomic % or more, and 5 atomic % or more; and/or 24.8 atomic % or less, 20 atomic % or less, 15 atomic % or less, 13 atomic % or less, 10 atomic % or less, 8 atomic % or less, and 6 atomic % or less.

The fact that the ratio of the amount of Pd with respect to the total amount of Rh and Pd in each of a large number of the fine composite-metal particles is close to the average ratio of the amount of Pd with respect to the total amount of Rh and Pd in the plurality of the fine composite-metal particles, indicates that there exist a large number of fine composite-metal particles each having a ratio of Pd close to the above mentioned average ratio of Pd. For example, when the above mentioned average ratio of Pd is a ratio which allows the exhaust gas purification catalyst according to the present invention to markedly exhibit its effect, the presence of a large number of fine composite-metal particles each having a ratio of Pd close to the above mentioned average ratio of Pd means that the effect of the exhaust gas purification catalyst according to the present invention can be further be improved.

Regarding the ratio of the amount of Pd with respect to the total amount of Rh and Pd in 70%, 75%, 80%, 85%, 90%, or 95% or more of the fine composite-metal particles, based on the number of the particles, the ratio thereof is not particularly limited, and may be, for example, 20% or more, 30% or more, 40% or more, and 50% or more; and 190% or less, 180% or less, 170% or less, and 160% or less, of the average ratio of the amount of Pd with respect to the total amount of Rh and Pd in the plurality of the fine composite-metal particles.

When the fine composite-metal particles have a ratio of Pd as described above, it is possible to allow Pd to effectively inhibit the oxidation of Rh, while maintaining a sufficient number of active sites on Rh for the removal of NOx. Therefore, it is possible to obtain an exhaust gas purification catalyst in which the NOx reducing ability is markedly improved.

It is easy to intentionally allow the ratio of the amount of Pd with respect to the total amount of Rh and Pd in each of the plurality of the fine composite-metal particles to be far from (such as, 1% or less, or the like of) the average ratio of the amount of Pd with respect to the total amount of Rh and Pd in the plurality of the fine composite-metal particles.

Note that in the present invention, the "ratio of the amount of Pd with respect to the total amount of Rh and Pd" refers to the ratio of the number of Pd atoms with respect to the total number of Rh atoms and Pd atoms contained in a fine composite-metal particle. In the present invention, the "ratio of the amount of Pd with respect to the total amount of Rh and Pd" is a value calculated by, for example, analyzing the fine composite-metal particle using an optical method, such as STEM-EDX. Further, in the present invention "the average ratio of the amount of Pd with respect to the total amount of Rh and Pd" is a value calculated by, for example, selecting 10 or more, 100 or more, or 1,000 or more fine particles from the exhaust gas purification catalyst at random; measuring each of all the selected fine particles by STEM-EDX or the like; further selecting all the fine composite-metal particles containing Rh and Pd from all the randomly selected fine particles; totaling the values of the ratio of the amount of Pd with respect to the total amount of Rh and Pd in each of the fine composite-metal particles; and dividing the total values of the ratio by the total number of the selected fine composite-metal particles.

In addition, in the present invention, the ratio "based on the number of the particles" refers to, unless otherwise specified, the ratio of the number of the fine composite-metal particles having a specific composition with respect to the total number of the fine composite-metal particles contained in the exhaust gas purification catalyst. The fine composite-metal particles contained in the exhaust gas purification catalyst according to the present invention have an excellent exhaust gas purification ability. Accordingly, it is to be understood that when at least 70% or more of the fine composite-metal particles, based on the number of the particles, has a preferred composition, the exhaust gas purification catalyst according to the present invention is capable of purifying a larger amount of exhaust gas, in terms of value per specific mass, specific volume or specific surface area thereof.

<Powder Carrier>

The fine composite-metal particles according to the present invention can be supported on the powdered support.

The powdered support for supporting the fine composite-metal particles is not particularly limited, and any metal oxide generally used as a powdered support in the art of the exhaust gas purification catalyst may be used.

Examples of the powdered support as described above include silica ($SiO_2$), magnesium oxide (MgO), zirconia ($ZrO_2$), ceria ($CeO_2$), alumina ($Al_2O_3$), titania ($TiO_2$), solid solutions thereof, and combinations thereof, and the like.

An oxide carrier, such as $SiO_2$, is compatible with catalyst metals which reduces NOx. A basic carrier, such as MgO, is compatible with K or Ba which stores NOx. $ZrO_2$ is capable of inhibiting the sintering of another powdered support(s) in high temperature conditions where sintering may occur in the other powdered support(s). Furthermore, by using $ZrO_2$ in combination with Rh as a catalyst metal, $H_2$ is generated due to the occurrence of a steam-reforming reaction, and the reduction of NOx can be carried out efficiency. $CeO_2$ has an OSC (Oxygen Storage Capacity), which is a property of storing oxygen in a lean atmosphere, and emitting oxygen in a rich atmosphere, whereby $CeO_2$ can be suitably used in a three-way catalyst and the like. An amphoteric carrier, such as $Al_2O_3$, has a high specific surface area, and thus it can be used to efficiently carry out the storage and reduction of NOx. $TiO_2$ is capable of preventing the catalyst metals from being poisoned by sulfur.

It is to be understood that in view of the properties of the above mentioned powdered supports, there is a possibility that the exhaust gas purification performance, in particular, the NOx purification performance, of the exhaust gas purification catalyst according to the present invention can be improved, depending on the type, composition, combinations and ratio thereof, and/or amount of the powdered support(s) to be selected.

<Relationship Between Rh Fine Particles, $CeO_2$ and NOx Storage and Reduction Mechanism>

(NOx Storage and Reduction Mechanism)

As described above, the NOx storage and reduction mechanism is a mechanism in which NO contained in an exhaust gas is oxidized to $NO_2$ to be stored, in a lean atmosphere, and the $NO_2$ is reduced to nitrogen ($N_2$) in a stoichiometric atmosphere and in a rich atmosphere.

(Behavior of Rh and NOx when Rh Fine Particles are Used in NOx Storage and Reduction Mechanism)

As described above, while Rh is a metal which easily reduces NOx, it is also a metal which is relatively easily oxidized. In a lean atmosphere, particularly in a lean atmosphere at low temperature, Rh fine particles exist in a state in which they are mostly oxidized. When the Rh oxide fine particles are exposed to a rich atmosphere, the Rh oxide fine particles are reduced to Rh fine metal particles, and this is believed to allow Rh to exhibit the NOx reducing ability. In other words, in order for Rh to exhibit the NOx reducing ability, it is preferred that Rh be in the form of Rh fine metal particles, not in the form of Rh oxide fine particles.

(Behavior of $CeO_2$ and NOx when $CeO_2$ is Used in NOx Storage and Reduction Mechanism)

$CeO_2$ has a property of easily adsorbing $NO_2$, in addition to the above mentioned OSC property. Accordingly, $CeO_2$ stores oxygen and adsorbs $NO_2$ in a lean atmosphere, and emits oxygen and $NO_2$ in a rich atmosphere. The reason for the fact that $CeO_2$ easily adsorbs $NO_2$ is believed to be due to $CeO_2$ being relatively basic as compared to $Al_2O_3$.

The present inventors have discovered that $CeO_2$ inhibits the reduction of Rh oxide in a rich atmosphere to result in an insufficient reduction of NOx, and that therefore, the specific combination of Rh and $CeO_2$ is unsuitable in terms of the NOx storage and reduction mechanism.

Accordingly, an exhaust gas purification catalyst containing Rh fine particles and $CeO_2$, for example, may not be preferred in terms of the NOx storage and reduction mechanism, because NOx stored in a lean atmosphere may not be sufficiently reduced in a rich atmosphere, a large amount of NOx may be emitted to the external environment, and there is a possibility that a high NOx spike may be observed. Note that "NOx spike" refers to a phenomenon in which the amount of NOx emission is momentarily increased, when the atmosphere is changed from the lean atmosphere to the rich atmosphere.

The present inventors have examined the above mentioned problems, and have discovered as a result of intensive studies, that it is possible to prevent the above mentioned problems, by using an exhaust gas purification catalyst which includes fine composite-metal particles containing Rh and Pd, and $CeO_2$ as a powdered support.

Without being bound by any theory, the reason for the above is believed to be as follows: in the above described fine composite-metal particles, since Pd is capable of inhibiting the oxidation of Rh, Rh oxide is easily reduced to Rh metal in a rich atmosphere, particularly in a rich atmosphere at low temperature.

Therefore, when the exhaust gas purification catalyst according to the present invention contains the above mentioned fine composite-metal particles and a powdered support containing $CeO_2$, it is possible to improve the catalyst activity of Rh in a rich atmosphere, in particular, in a rich atmosphere at low temperature, while increasing the amount of NOx adsorption in a lean atmosphere. Accordingly, when the exhaust gas purification catalyst according to the present invention contains $CeO_2$ as a powdered support, the ability of the catalyst to purify exhaust gas, particularly an exhaust gas containing NOx, can be improved.

In particular, in the exhaust gas purification catalyst according to the present invention, it is preferred that the powdered support contain $CeO_2$ in an amount of more than 0% by mass and 40% by mass or less with respect to the mass of the powdered support.

When the powdered support contains $CeO_2$ at a relatively high ratio with respect to the mass of the powdered support, for example, in an amount of more than 0% by mass, the above mentioned NOx adsorption capacity can be improved. Therefore, the amount of $CeO_2$ contained in the powdered support may be more than 0% by mass, 5% by mass or more, 10% by mass or more, 15% by mass or more, 20% by mass or more, or 24% by mass or more, with respect to the mass of the powdered support.

When the powdered support contains $CeO_2$ at a relatively low ratio with respect to the mass of the powdered support, for example, in an amount of 40% by mass or less, it is possible to sufficiently inhibit the oxidation of Rh by $CeO_2$, and/or to sufficiently suppress the consumption of a reducing agent, such as hydrocarbon, due to oxygen released from $CeO_2$ in a rich atmosphere. Therefore, the amount of $CeO_2$ contained in the powdered support may be 40% by mass or less, 35% by mass or less, or 29% by mass or less, with respect to the mass of the powdered support.

The amount of the fine composite-metal particles supported on the powdered support in general may be, for example, 0.01 parts by mass or more, 0.05 parts by mass or more, 0.1 parts by mass or more, 0.5 parts by mass or more, or 1 part by mass or more; and/or 5 parts by mass or less, 3 parts by mass or less, or 1 part by mass or less; with respect to 100 parts by mass of the powdered support, but not particularly limited thereto.

<NOx Storage Material>

The exhaust gas purification catalyst according to the present invention optionally contains a NOx storage material.

The NOx storage material may be a basic material, but not particularly limited thereto. Examples of the NOx storage material can include: alkali metals and salts thereof, such as potassium (K) and potassium acetate; alkali earth metals and salts thereof, such as barium (Ba) and barium acetate; and combinations thereof.

<<Method for Purifying Exhaust Gas>>

In the method for purifying exhaust gas according to present invention, the exhaust gas purification catalyst according to the present invention is brought into contact with an exhaust gas containing HC, CO and NOx, in a stoichiometric atmosphere, and thereby oxidizing HC and CO, and reducing NOx, to purify the exhaust gas.

The method according to the present invention is preferably used in an internal combustion engine which operates in a stoichiometric atmosphere. In a stoichiometric atmosphere, HC and CO as reducing agents react with NOx as an oxidizing agent at a theoretically equivalent ratio, thereby allowing for the conversion of HC, CO and NOx to $H_2O$, $CO_2$, and $N_2$.

Any method may be used for bringing the exhaust gas purification catalyst according to the present invention into contact with an exhaust gas, in a stoichiometric atmosphere.

Further, in the method for purifying exhaust gas according to the present invention, the exhaust gas purification catalyst according to the present invention is brought into contact with an exhaust gas containing NOx in a lean atmosphere, and the NOx is reduced in a rich atmosphere, to purify the exhaust gas.

The method according to the present invention is preferably used in an internal combustion engine which operates in a lean atmosphere. This is because, while HC and CO are easily oxidized and removed, NOx is less likely to be reduced and removed in a lean atmosphere, and thus it results in the emission of a large amount of NOx.

Any method can be used for bringing the exhaust gas purification catalyst according to the present invention into contact with an exhaust gas containing NOx in a lean atmosphere.

<<Method for Producing Exhaust Gas Purification Catalyst>>

The method for producing an exhaust gas purification catalyst according to the present invention includes producing fine composite-metal particles by heating a solution containing Rh ions, Pd ions, a reducing agent, and a protecting agent to reflux, wherein the molar ratio of the Rh ions to the Pd ions is from 70:30 to 99:1.

Nano-sized fine metal particles typically have an electronic energy structure that is different from the energy structure of a mass of the metal, due to the quantum size effect, and exhibit different electrical and optical properties depending on the particle size. Further, nano-sized fine metal particles having a very large specific surface area are believed to function as a highly active catalyst.

As for a method for producing the nano-sized fine metal particles as described above, a chemical reduction method is known, in which a reducing agent such as an alcohol is added to a mixed solution containing salts of each metal element, and the ions of the metal element contained in the mixed solution are reduced simultaneously, while heating the mixed solution as required.

However, when metal ions which are different from each other are chemically reduced, typically, the metal element(s) having a higher oxidation-reduction potential is/are reduced before the metal element(s) having a lower oxidation-reduction potential is/are reduced. Therefore, there are cases where fine composite-metal particle having a so-called core-shell structure, in which a metal element(s) having a higher oxidation-reduction potential exists in the central region of the fine particle, around which a metal element(s) having a lower oxidation-reduction potential exists, may be formed.

Since elements are not uniformly distributed in the fine composite-metal particles having the core-shell structure, there is a potential risk that the catalyst may not be able to fully exhibit its performance.

In view of the above, Patent Document 1, for example, discloses a method in which a composite metal colloid dispersion obtained by mixing a solution of rhodium chloride and a solution of palladium chloride at a molar ratio of 1:1 is subjected to irradiation of laser beams, to allow the elements in the composite metal colloidal fine particles to be distributed uniformly.

In contrast, the method according to the present invention can be carried out without the use of laser beams or the like. Therefore, it is possible to produce fine composite-metal particles which contain Rh and Pd and in which elements are uniformly distributed, with less number of steps. As a result, it is possible to provide a cost effective and environmentally-friendly method for producing an exhaust gas purification catalyst.

Without being bound by any theory, the reason for being able to produce fine composite-metal particles which contain Rh and Pd and in which elements are uniformly distributed, without using laser beams or the like, from a liquid phase, is believed that the reduction of the each metal ion occurs almost simultaneously due to the value of the oxidation-reduction potential of Rh (0.758 V) and the value of the oxidation-reduction potential of Pd (0.99 V) being close.

The period of time for heating a solution containing Rh ions, Pd ions, a reducing agent, and a protecting agent to reflux is not particularly limited, and may be, for example, 0.5 hours or more, 1 hour or more, 1.5 hours or more, and 3 hours or more, and/or 48 hours or less, 24 hours or less, 12 hours or less, and 6 hours or less.

Further, the method according to the present invention may further and optionally include supporting the fine composite-metal particles on the powdered support, during or after producing the fine composite-metal particles.

The fine composite-metal particles may be supported on the powdered support in any order and by any method. The fine composite-metal particles may be supported on the powdered support, for example, in the order and by the method as follows: a solution containing Rh ions, Pd ions, a reducing agent, and a protecting agent is heated to reflux, and a powdered support is then added to the solution to stir, thereby supporting the fine composite-metal particles on the powdered support. With the above mentioned order and method, the fine composite-metal particles can be efficiency supported on the powdered support.

<Rh Ions and Pd Ions>

Rh ions and Pd ions are contained in a solution containing a reducing agent and a protecting agent.

Examples of the source of Rh ions can include, but is not particularly limited to, salts of Rh, Rh halides and the like, and combinations thereof. Examples of the source of Rh ions can include: inorganic salts of Rh, such as nitrate, phosphate and sulfate salts; organic acid salts of Rh, such as oxalate and acetate salts; Rh halides, such as fluoride, chloride, bromide, and iodide; and combinations thereof.

With respect to the source of Pd ions, the above mentioned descriptions of the source of Rh ions can be referred to.

The concentrations of Rh ions and Pd ions are not particularly limited. It is preferred that the total concentration of Rh ions and Pd ions be in the range of from 0.01 M to 0.20 M.

The molar ratio of Rh ions to Pd ions is not particularly limited, and it may be correlated to the molar ratio of Rh to Pd in the fine composite-metal particles of interest. The molar ratio may be, for example, from 70:30 to 99:1, from 75:25 to 95:5, and from 80:20 to 90:10.

The molar ratio of Rh ions to Pd ions is not particularly limited, as long as the above mentioned fine composite-metal particles of the exhaust gas purification catalyst according to the present invention can be produced. The above mentioned molar ratio may be correlated to the average ratio of the amount of Pd with respect to the total amount of Rh and Pd in the fine composite-metal particles included in the exhaust gas purification catalyst according to the present invention. When that is the case, the molar ratio of Rh ions to Pd ions may be selected taking into consideration a measure of reduction of these ions, such as oxidation-reduction potential, or a degree of solid solution of these elements.

<Reducing Agent>

A reducing agent is contained in a solution containing Rh ions Pd ions, and a protecting agent.

The reducing agent can be used for reducing Rh ions and Pd ions to produce the fine composite-metal particles. Further, the reducing agent may optionally have a function as a solvent.

As the reducing agent, for example, a reducing agent having a boiling point of 95° C. or more, 100° C. or more, 110° C. or more, or 120° C. or more, under standard conditions, is preferred, but not particularly limited thereto.

When the reducing agent has a boiling point as described above, it is possible to reduce Rh ions and Pd ions efficiency, and to produce fine composite-metal particles in which elements of Rh and Pd are uniformly distributed. Therefore, the temperature for heating the solution containing Rh ions, Pd ions, a reducing agent, and a protecting agent to reflux is preferably a temperature equal to or higher than the boiling point of the above mentioned reducing agent.

Examples of the reducing agent can include, but not particularly limited to, alcohols, glycols, aldehydes and the like, and combinations thereof. Examples of the reducing agent can include alcohols, such as propanol, butanol, and pentanol; glycols, such as ethylene glycol; aldehydes such as valeraldehyde; and combinations thereof.

The amount of the reducing agent is not particularly limited, and the molar quantity thereof may be, for example, in the range of from one to 100,000 times, in the range of from one to 50,000 times, and in the range of from one to 10,000 times, with respect to the total molar quantity of Rh and Pd.

<Protecting Agent>

A protecting agent is contained in a solution containing Rh ions, Pd ions, and a reducing agent.

The protecting agent is capable of preventing an excessive aggregation of the fine composite-metal particles to each other, and allowing the fine composite-metal particles to be moderately dispersed in the solution. Accordingly, it is possible for the protecting agent to moderately disperse a plurality of the fine composite-metal particles having an approximately uniform nano particle size in the exhaust gas catalyst.

Examples of the protecting agent can include, but not particularly limited to: polyvinylpyrrolidone (PVP), polyvinylpyrrolidone K25 (PVP-K25), polyethyleneimine, polyallylamine, poly(N-carboxymethyl)allylamine, poly(N,N-dicarboxymethyl), allylamine, poly (N-carboxymethyl) ethyleneimine and the like, and combinations thereof. Among these, PVP is preferred in terms of high solubility.

The concentration of the protecting agent is not particularly limited, as long as the aggregation of the fine metal particles with each other can be prevented. The molar quantity of the protecting agent may be, for example, in the range of from one to 1,000 times, in the range of from one to 500 times, and in the range of from one to 100 times, with respect to the total molar quantity of Rh and Pd. When the protecting agent is a polymer such as PVP, the molar quantity of the protecting agent refers to the molar quantity of the monomer units in the polymer.

<Solvent>

A solvent is optionally contained in the solution containing Rh ions, Pd ions, a reducing agent, and a protecting agent.

The solvent is not particularly limited. The boiling point of the solvent is preferably higher than the boiling point of the above mentioned reducing agent.

<Other Components>

With respect to the components of the method according to the present invention, the above mentioned descriptions regarding the exhaust gas purification catalyst can be referred to.

The present invention will now described in further detail with reference to the following Examples, but the scope of the present invention is in no way limited by the following Examples.

EXAMPLES

Example 1 (Liquid Phase Reduction Method)

<Preparation of Mixed Solution Containing Catalyst Metals>

A quantity of 0.078 mmol of palladium chloride ($PdCl_2$) as Pd ions and 5 mL of distilled water were measured and mixed in a 100 mL beaker. Further, 1.477 mmol of rhodium chloride ($RhCl_3$) as Rh ions, and 5 mL of distilled water were measured and mixed in a 100 mL beaker. The resulting Pd solution and the Rh solution were mixed to prepare a solution A.

A quantity of 3.452 g of PVP-K25 as a protecting agent and 150 mL of 1-propanol as a reducing agent were measured and mixed in a 500 mL separable flask, and the resulting mixture was stirred to dissolve PVP-K25, thereby preparing a solution B.

The solution A was poured into the 500 mL separable flask containing the solution B, while washing the container of the solution A with 150 mL of 1-propanol, and the resulting mixed solution was stirred. Next, the 500 mL separable flask containing the mixed solution was immersed in an oil bath controlled at 102° C., and the solution was heated to reflux for 1.5 hours while carrying out $N_2$ bubbling. After being heated to reflux, the resulting mixed solution was cooled to room temperature.

<Supporting Catalyst Metals on Powdered Support>

On the other hand, 80 g of $Al_2O_3$—$CeO_2$—$ZrO_2$ as a powdered support was measured and placed in a 500 mL beaker. To the 500 mL beaker, the mixed solution obtained above was added, followed by stirring, and the resultant was warmed by immersing in hot water to evaporate the solvent. The resulting residue was dried in a drying furnace overnight, and the resultant was then cracked, and calcined in a calcination furnace at 500° C. for 2 hours.

<Pressing of Calcined Product>

The resulting calcined product was taken out of the calcination furnace, and placed in a bag for CIP (Cold Isostatic Pressing method), and the bag was vacuum-sealed. The resultant was pressed at 1 ton/cm², sifted, and beaten with a pestle to form pellets. The resulting pellets were used as a sample of the exhaust gas purification catalyst. Note that, if the calcined product was an aggregated state when it was taken out of the calcination furnace, the calcined product may be cracked with a pestle.

Examples 2 and 3, and Comparative Examples 1 and 2 (Liquid Phase Reduction Method)

Each of the samples of the exhaust gas purification catalyst in Examples 2 and 3 and Comparative Examples 1 and 2 was prepared in the same manner as in Example 1, other than the molar quantities of Rh and Pd were changed.

Comparative Example 3 (Impregnation Method)

<Preparation of Mixed Solution Containing Catalyst Metals>

A quantity of 0.09 g of palladium nitrate (8.2% by mass) as Pd ions and 1.57 g of rhodium nitrate (2.75% by mass) as Rh ions were measured, and placed in a 100 mL beaker along with 50 mL of ion exchanged water, and the resultant was stirred to prepare a solution C.

<Supporting Catalyst Metals on Powdered Support>

On the other hand, 25 g of $Al_2O_3$—$CeO_2$—$ZrO_2$ as a powdered support was measured and placed in a 500 mL beaker along with 150 mL of ion exchanged water, and the resultant was stirred to prepare a solution D.

The solution C and solution D obtained above were mixed after prewashing the container with ion exchanged water, to prepare a solution E. The resulting solution E was evaporated to dryness. The resulting dry solid was dried in a drying furnace overnight, and the resultant was then calcined in a calcination furnace at 500° C. for 2 hours.

<Pressing of Calcined Product>

The resulting calcined product was taken out of the calcination furnace, and placed in a bag for CIP (Cold Isostatic Pressing method), and the bag was vacuum-sealed. The resultant was pressed at 1 ton/cm², sifted, and beaten with a pestle to form pellets. The resulting pellets were used as a sample of the exhaust gas purification catalyst. Note that, if the calcined product was an aggregated state when it was taken out of the calcination furnace, the calcined product may be cracked with a pestle.

The molar quantities of Rh and Pd used in Examples 1 to 3 and Comparative Examples 1 to 3 are shown in the following Table 1.

TABLE 1

| Examples | Production Method | Rh (mmol) | Pd (mmol) | Form of Fine particles | Ratio of Rh to Pd (molar ratio) |
|---|---|---|---|---|---|
| Example 1 | Liquid phase reduction method | 1.477 | 0.078 | Fine composite-metal particles | 95:5 |
| Example 2 | Liquid phase reduction method | 1.322 | 0.233 | Fine composite-metal particles | 85:15 |
| Example 3 | Liquid phase reduction method | 1.088 | 0.466 | Fine composite-metal particles | 70:30 |
| Comparative Example 1 | Liquid phase reduction method | 1.555 | 0.000 | Rh fine particles | 100:0 |
| Comparative Example 2 | Liquid phase reduction method | 0.000 | 1.555 | Pd fine particles | 0:100 |
| Comparative Example 3 | Impregnation method | 0.420 | 0.069 | Rh or Pd fine particles | 85:15* |

Note that, "85:15*" in Table 1 shows that Rh fine particles and Pd fine particles exist individually in the sample of Comparative Example 3, and that Rh and Pd are contained in the sample at a molar ratio of 85:15.

<STEM-EDX Analysis>

Each of the samples of exhaust gas purification catalyst prepared in Examples 1 to 3 and Comparative Examples 1 to 3 was subjected to STEM-EDX analysis, and from each of the STEM images thereby obtained, a plurality of fine metal particles were selected as measurement points, and the compositions and the particle sizes of the fine metal particles at the each measurement point was evaluated. The results of Examples 1 to 3 and Comparative Examples 1 and 3 are shown in FIGS. 1 to 5, respectively. In each of Examples and Comparative Examples, the average particle size of the sample was about 3 nm.

It can be seen from FIG. 1(a) that the fine particles are dispersed in the exhaust gas purification catalyst.

It can be seen from FIG. 1(b) that the fine particles are fine composite-metal particles containing Rh and Pd. Further, FIG. 1(b) indicates that the ratio of the amount of Pd with respect to the total amount of Rh and Pd in each of the fine composite-metal particles is in the range of from 2 atomic % to 13.5 atomic %. In addition, it is understood that the average ratio of the amount of Pd with respect to the total amount of Rh and Pd in a plurality of the fine composite-metal particles, which is obtained by calculating the arithmetic mean of the values of the ratio of the amount of Pd with respect to the total amount of Rh and Pd in each of the fine composite-metal particles, is 7.5 atomic %.

Accordingly, it is understood that the ratio of the amount of Pd with respect to the total amount of Rh and Pd in each of the fine composite-metal particles is in the range of from 27% to 180% of the average ratio of the amount of Pd with respect to the total amount of Rh and Pd in the plurality of the fine composite-metal particles.

It can be seen from FIG. 2(a) that the fine particles are dispersed in the exhaust gas purification catalyst.

It can be seen from FIG. 2(b) that the fine particles are fine composite-metal particles containing Rh and Pd. Further, FIG. 2(b) indicates that the ratio of the amount of Pd with respect to the total amount of Rh and Pd in each of the fine composite-metal particles is in the range of from 12 atomic % to 31 atomic %. In addition, it is understood that the average ratio of the amount of Pd with respect to the total amount of Rh and Pd in a plurality of the fine composite-metal particles, which is obtained by calculating the arithmetic mean of the values of the ratio of the amount of Pd with respect to the total amount of Rh and Pd in each of the fine composite-metal particles, is 16.5 atomic %.

Accordingly, it is understood that the ratio of the amount of Pd with respect to the total amount of Rh and Pd in each of the fine composite-metal particles is in the range of from 72.7% to 188% of the average ratio of the amount of Pd with respect to the total amount of Rh and Pd in the plurality of the fine composite-metal particles.

It can be seen from FIG. 3(a) that the fine particles are dispersed in the exhaust gas purification catalyst.

It can be seen from FIG. 3(b) that the fine particles are fine composite-metal particles containing Rh and Pd. Further, FIG. 3(b) indicates that the ratio of the amount of Pd with respect to the total amount of Rh and Pd in each of the fine composite-metal particles is in the range of from 5.5 atomic % to 46.4 atomic %. In addition, it is understood that the average ratio of the amount of Pd with respect to the total amount of Rh and Pd in a plurality of the fine composite-metal particles, which is obtained by calculating the arithmetic mean of the values of the ratio of the amount of Pd with respect to the total amount of Rh and Pd in each of the fine composite-metal particles, is 24.8 atomic %.

Accordingly, it is understood that the ratio of the amount of Pd with respect to the total amount of Rh and Pd in each of the fine composite-metal particles is in the range of from 22% to 187% of the average ratio of the amount of Pd with respect to the total amount of Rh and Pd in the plurality of the fine composite-metal particles.

As described above, the fact that the ratio of the amount of Pd with respect to the total amount of Rh and Pd in each of the fine composite-metal particles is in the range of from about 20% to about 190% of the average ratio of the amount of Pd with respect to the total amount of Rh and Pd in the plurality of the fine composite-metal particles, indicates, in other words, that there exist a large number of fine composite-metal particles each having a ratio of Pd close to the above mentioned average ratio of Pd.

It can be seen from FIG. 4(a) that the fine particles are dispersed in the exhaust gas purification catalyst. It can be seen from FIG. 4(b) that the above mentioned fine particles are fine metal particles containing Rh alone.

It can be seen from FIG. 5(a) that the fine particles are dispersed in the exhaust gas purification catalyst. It can be seen from FIG. 5(b) that the above mentioned fine particles are fine metal particles containing Rh alone or Pd alone.

<<Catalyst Evaluation A>>

Each of the samples of the exhaust gas purification catalyst prepared in Examples 1 to 3 and Comparative Examples 1 to 3 was evaluated for its performance as a three-way catalyst, and each of the samples of the exhaust gas purification catalyst prepared in Examples 1 to 3 and Comparative Example 1 was evaluated for its performance as a NOx storage-reduction catalyst.

<Performance Evaluation A as Three-Way Catalyst>

In the performance evaluation A as a three-way catalyst, a gas circulation type catalyst evaluation apparatus was used. Specifically, a test gas was circulated through the catalyst evaluation apparatus, and the composition of the test gas after being brought into contact with each of the samples was measured, by using an infrared spectrometry (FT-IR).

The mass of each of the above mentioned samples was 3 g, and the composition of the test gas used in the evaluation as a three-way catalyst was constituted as follows: NO: 0.15%, $O_2$: 0.70%, $CO_2$: 10.00%, CO: 0.65%, $C_3H_6$: 0.10%, $H_2O$: 3.00% and $N_2$: balance.

Further, the flow velocity of the test gas was set to 20 L/min, the rate of temperature rise during the evaluation was set to 20° C./min, and the evaluation was carried out at a temperature in the range of from 100° C. to 400° C. The measurement conditions are summarized in FIG. 6.

The evaluation as a three-way catalyst was carried out, specifically, by measuring the temperature (° C.) and the NOx purification rate (%); and by measuring the average ratio (atomic %) of the amount of Pd with respect to the total amount of Rh and Pd, and the 50% NOx purification temperature (° C.). The results are shown in FIG. 7 and FIG. 8, respectively.

(Measurement of Temperature (° C.) and NOx Purification Rate (%))

Figure 7:
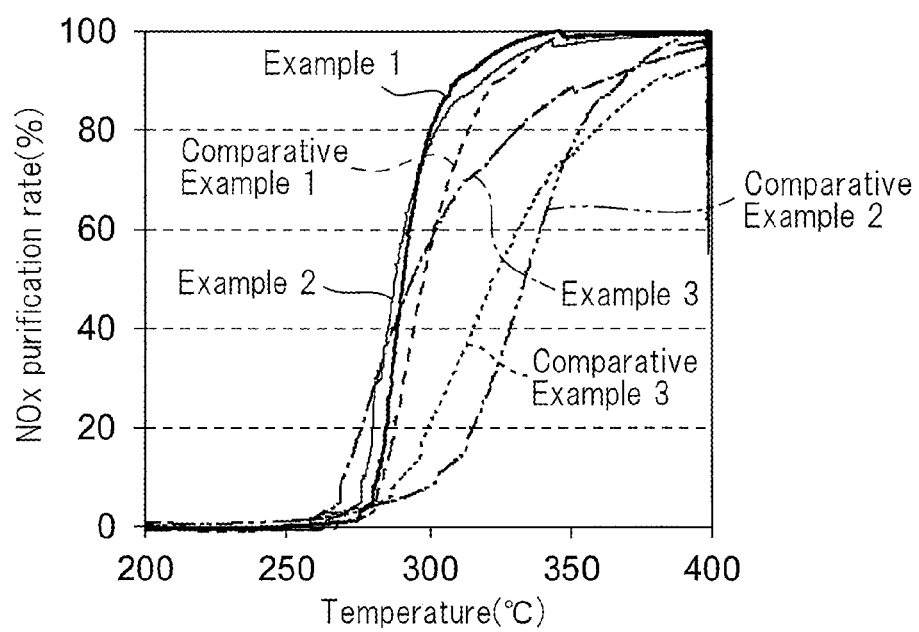
FIG. 7 is a graph illustrating the relationship between the temperature (° C.) and the NOx purification rate (%) of the exhaust gas purification catalysts in Examples 1 to 3 and Comparative Examples 1 to 3, when the activity of the catalysts was evaluated.
Figure 8:
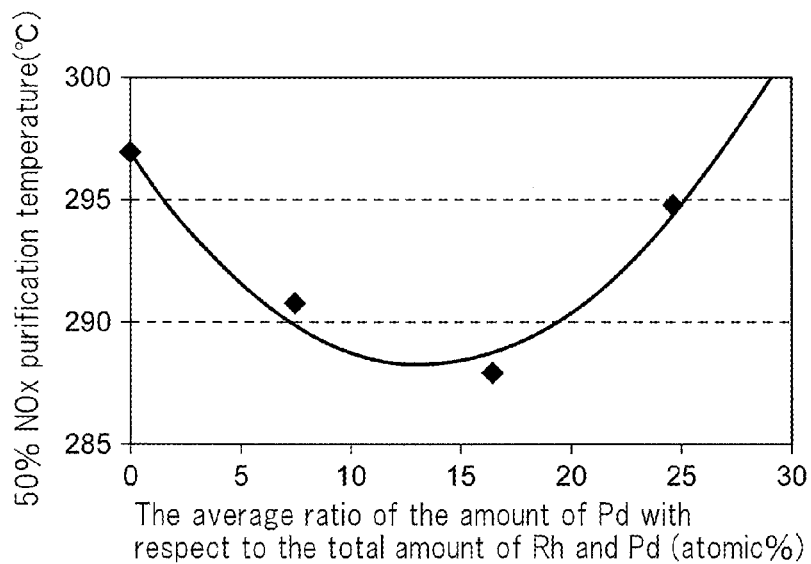
FIG. 8 is a graph illustrating the relationship between the ratio (atomic %) of the amount of Pd with respect to the total amount of Rh and Pd, and the 50% NOx purification temperature (° C.), of the exhaust gas purification catalysts in Examples 1 to 3 and Comparative Example 1.

FIG. 7 is a graph illustrating the relationship between the temperature (° C.) and the NOx purification rate (%) of the exhaust gas purification catalysts in Examples 1 to 3 and Comparative Examples 1 to 3, when the activity of the catalysts was evaluated. The following observations (i) to (iii) can be made from FIG. 7.

(i) Within the range in which the NOx purification rate is from about 0% to about 60%, the temperatures of the samples in Examples 1 to 3, which include fine composite-metal particles containing Rh and Pd, are lower compared to the temperature of the sample in Comparative Example 1, which includes Rh fine particles alone. Within the range in which the NOx purification rate (%) is from about 0% to about 95%, in particular, the temperatures of the samples in Examples 1 and 2 are lower compared to the temperature of the sample in Comparative Example 1.

(ii) Within the range in which the NOx purification rate is from about 5% to 95%, the temperatures of the samples in Examples 1 to 3, which include fine composite-metal particles containing Rh and Pd, are lower compared to the temperature of the sample in Comparative Example 2, which includes Pd fine particles alone.

(iii) The NOx purification rates of the samples in Examples 1 to 3, which include fine composite-metal particles containing Rh and Pd, are higher, at least in the range of from about 260° C. to 400° C., as compared to the NOx purification rate of the sample in Comparative Example 3, which includes Rh fine particles and Pd fine particles.

Accordingly, it is understood from the above mentioned observations (i) to (iii), that the exhaust gas purification catalysts which include fine composite-metal particles containing Rh and Pd have a higher NOx purification rate and a higher activity, as compared to the conventional exhaust gas purification catalysts which include Rh fine particles alone, Pd fine particles alone, or both the Rh fine particles and Pd fine particles.

The reason for this is believed that since Pd inhibits the oxidation of Rh and thus it is possible to maintain the metallic state of Rh for a long time, the NOx purification performance of the catalyst was maintained or improved.

(Measurement of the Average Ratio (Atomic %) of the Amount of Pd with Respect to the Total Amount of Rh and Pd and 50% NOx Purification Temperature (° C.))

FIG. 8 is a graph illustrating the relationship between the average ratio (atomic %) of the amount of Pd with respect to the total amount of Rh and Pd, and the 50% NOx purification temperature (° C.), of the exhaust gas purification catalysts in Examples 1 to 3 and Comparative Example 1. It can be seen from FIG. 8 that the samples in Examples 1 to 3, which include fine composite-metal particles containing Rh and Pd, achieve 50% NOx purification at a lower temperature as compared to the sample in Comparative Example 1, which includes Rh fine particles (Pd: 0 atomic %).

Further, the curve representing the relationship between the average ratio (atomic %) of the amount of Pd with respect to the total amount of Rh and Pd and the 50% NOx purification temperature (° C.), forms a downward convex curve. Thus, it can be seen from FIG. 8 that there exists a temperature range in which the 50% NOx purification temperature becomes lower than that of the conventional catalysts, in other words, exists a temperature range in which the exhaust gas purification catalyst is activated. Therefore, it is understood that the average ratio of the amount of Pd with respect to the total amount of Rh and Pd corresponding to the above mentioned temperature range, is an average ratio of the amount of Pd with respect to the total amount of Rh and Pd which is suitable for the removal of NOx.

When the 50% NOx purification temperatures of the samples in Examples 1 to 3 and the sample in Comparative Example 1 are compared with each other, it can be seen that the 50% NOx purification temperature (294.8° C.) of the sample (Pd: 24.8 atomic %) in Example 3 is lower compared to the 50% NOx purification temperature (296.9° C.) of the sample (Pd: 0 atomic %) in Comparative Example 1. Further, it is understood from the curve illustrated in FIG. 8 that, when the average ratio of the amount of Pd with respect to the total amount of Rh and Pd is more than 0 atomic % and less than about 27 atomic %, the 50% NOx purification temperature is lower than 296.9° C. In addition, it is also understood that there exists an optimal range of the average ratio of the amount of Pd with respect to the total amount of Rh and Pd for removing NOx, in the temperature range of 294.8° C. (which is the 50% NOx purification temperature of the sample in Example 3) or less, and that the optimal range of the average ratio is from about 1.7 atomic % to 24.8 atomic % based on the curve shown in FIG. 8.

When the ratio of the amount of Pd with respect to the total amount of Rh and Pd in each of the fine composite-metal particles is in the range of from about 20% to about 190% of the average ratio of the amount of Pd with respect to the total amount of Rh and Pd in the plurality of the fine composite-metal particles, as described above, it is understood that, in the samples of Examples 1 to 3, there exist a large number of fine composite-metal particles each having a ratio of Pd close to the average ratio (about 1.7 atomic % to 24.8 atomic %) of Pd which is effective for removing NOx. Therefore, it is understood that the NOx purification performance of the samples in Examples 1 to 3 are further improved, due to the fact that a plurality of the fine composite-metal particles have a ratio of the amount of Pd with respect to the total amount of Rh and Pd which falls in the range of from about 20% to about 190% of the average ratio of the amount of Pd with respect to the total amount of Rh and Pd in the plurality of the fine composite-metal particles.

Figure 9:
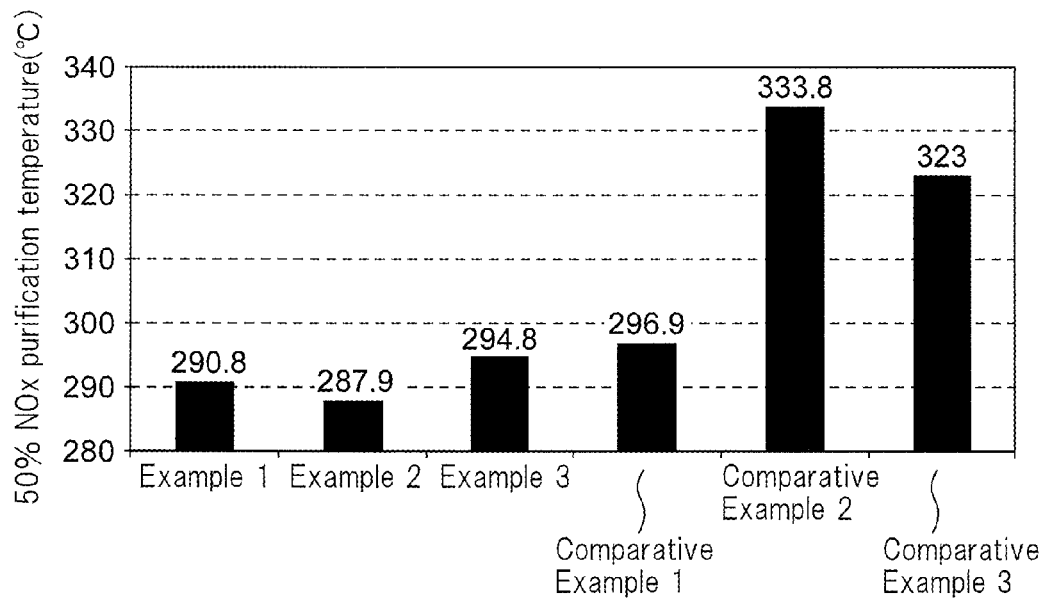
FIG. 9 is a graph illustrating the 50% NOx purification temperature (° C.) of the exhaust gas purification catalysts in Examples 1 to 3 and Comparative Examples 1 to 3.

The relationship between the samples in Examples 1 to 3 and Comparative Examples 1 to 3, and the 50% NOx purification temperature (° C.) is shown in Table 2 and FIG. 9.

TABLE 2

| Examples | Form of Fine particles | Ratio of Rh to Pd (molar ratio) | Average ratio of the amount of Pd with respect to the total amount of Rh and Pd (% by atom) | 50% NOx purification temperature (° C.) |
|---|---|---|---|---|
| Example 1 | Fine composite-metal particles | 95:5 | 7.5 | 290.8 |
| Example 2 | Fine composite-metal particles | 85:15 | 16.5 | 287.9 |
| Example 3 | Fine composite-metal particles | 70:30 | 24.8 | 294.8 |
| Comparative Example 1 | Rh fine particles | 100:0 | 0 | 296.9 |
| Comparative Example 2 | Pd fine particles | 0:100 | 100 | 333.8 |
| Comparative Example 3 | Rh or Pd fine particles | 85:15* | 100 or 0 | 323.0 |

Note that, "85:15*" in Table 2 shows that Rh fine particles and Pd fine particles exist individually in the sample of Comparative Example 3, and that Rh and Pd are contained in the sample at a molar ratio of 85:15.

It can be understood from Table 2 and FIG. 9 that the 50% NOx purification temperatures of the samples in Examples 1 to 3 are lower compared to the 50% NOx purification temperatures of the samples in Comparative Examples 2 and 3, and thereby indicating that the samples in Examples 1 to 3 have a higher NOx purification performance.

In particular, when the sample of Example 2 prepared by the liquid phase reduction method is compared with the sample of Comparative Example 3 prepared by the impregnation method, although the molar ratios of Rh to Pd in the samples are approximately the same, the 50% NOx purification temperature of the sample of Example 2 is 35° C. or more lower than the sample of Comparative Example 3.

This is believed that the catalyst fine metal particles in the sample of Example 2 contain Rh and Pd, and that Rh and Pd coexist at nano-level. In other words, this is believed that since Pd inhibits the oxidation of Rh and thereby maintains the metallic state of Rh, Rh was activated, and resulted in a lower 50% NOx purification temperature of the sample of Example 2.

Further, since Pd itself also has a high exhaust gas purification ability, it is believed that the fine composite-metal particles containing Rh and Pd produce a synergistic effect of purifying exhaust gas, due to the coexistence of these two kinds of metal elements.

<Performance Evaluation A as NOx Storage-Reduction Catalyst>

For the performance evaluation as a NOx storage-reduction catalyst, the samples of the catalyst were prepared in the same manner as the samples in Examples 1 to 3 and Comparative Example 1 used for the performance evaluation as a three-way catalyst, other than, in each of Examples and Comparative Example, 32 g of $Al_2O_3$—$ZrO_2$—$TiO_2$ was used as a powdered support, and 11% by mass of barium acetate was used as a NOx storage material, based on the mass of the sample. Hereinafter, the above mentioned samples (3 g) prepared for the performance evaluation as a NOx storage-reduction catalyst are referred to as the samples of Example 1', 2', and 3', and Comparative Example 1'.

Further, in the performance evaluation as a NOx storage-reduction catalyst, a gas circulation type catalyst evaluation apparatus was used. Specifically, a test gas was circulated through the catalyst evaluation apparatus, and the composition of the test gas after being brought into contact with each of the samples was measured, by using an infrared spectrometry (FT-IR).

Figure 10:
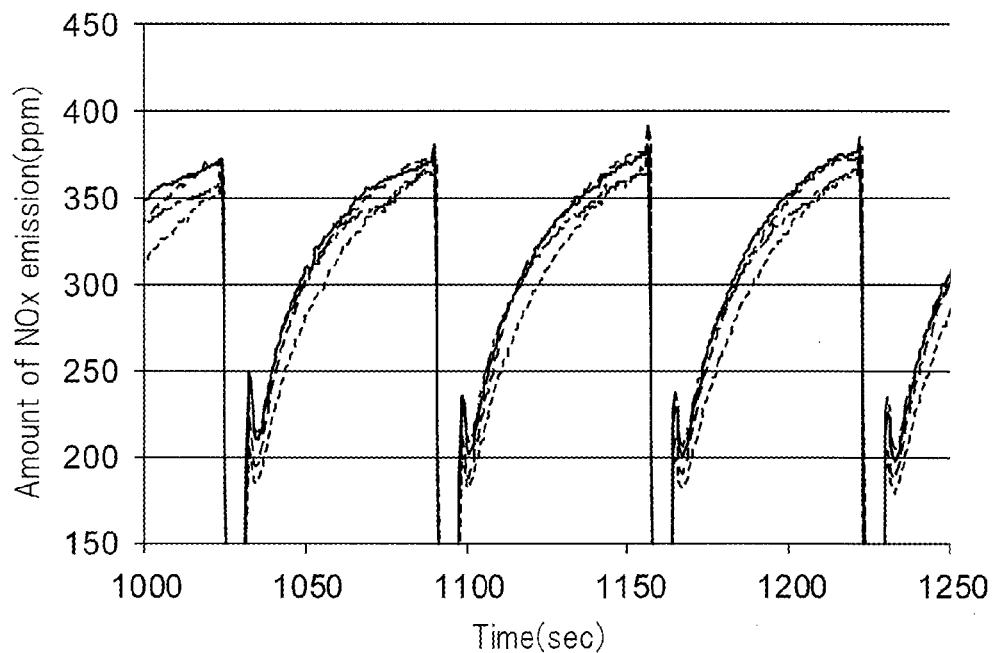
FIG. 10 is a graph illustrating the relationship between the time (sec) and the amount of NOx emission (ppm) from catalysts, when the samples of the exhaust gas purification catalyst in Examples 1' to 3' and Comparative Examples 1', which were obtained by replacing each of the carriers used in the samples in Examples 1 to 3 and Comparative Example 1 to $Al_2O_3$—$ZrO_2$—$TiO_2$ and by adding barium acetate thereto, were exposed to a lean atmosphere and a rich atmosphere.
Figure 11:
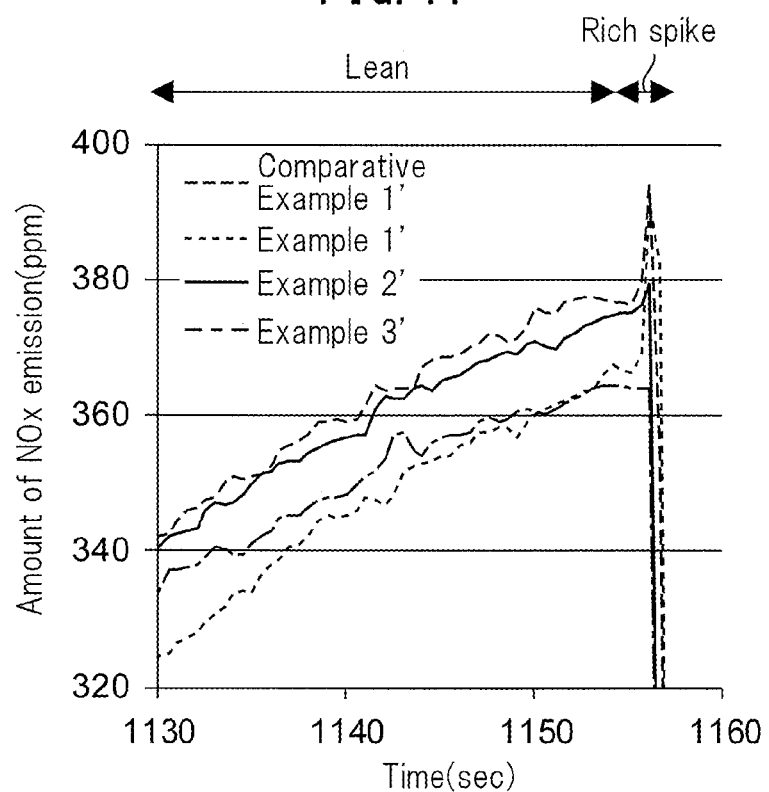
FIG. 11 is an enlarged view of a portion of the graph illustrated in FIG. 10.

The test gas was constituted by a lean atmosphere and a rich atmosphere. In the above mentioned evaluation, a 60-second period of lean atmosphere and a 6-second period of rich atmosphere were repeated alternately, at a temperature of 450° C. The compositions of the lean atmosphere and the rich atmosphere of the test gas are shown in Table 3, and the results of the evaluation are shown in FIG. 10 and FIG. 11.

TABLE 3

| | Test gas | | | | | | |
|---|---|---|---|---|---|---|---|
| | NO (%) | $O_2$ (%) | $CO_2$ (%) | $H_2$ (%) | $C_3H_6$ (%) | CO (%) | $H_2O$ (%) | $N_2$ (%) |
| Lean | 0.04 | 7 | 10 | — | — | — | 4 | Balance |
| Rich | — | — | 10 | 1 | 0.1 | 6 | 4 | Balance |

Further, the flow velocity of the test gas was set to 20 L/min, and the space velocity (SV: Space Velocity) was set to 200,000 h$^{-1}$. Note that, the space velocity refers to a value obtained by dividing the value of the flow rate (volume/h) of the test gas by the value of the volume of the sample.

The "λ", which is an index of the strength of the lean atmosphere, is defined as "oxidizing agent equivalent/reducing agent equivalent". For example, the rich, stoichiometric, and lean atmospheres can be represented as $\lambda<1$, $\lambda=1$, and $\lambda>1$, respectively.

It can be seen from FIG. 10, that, during the 60 second periods of the lean atmosphere, the storage of NO into the samples tends to be gradually saturated, and the amount of NOx emission (ppm) tends to gradually increase. It can also be seen from FIG. 10 that the so-called rich spike operation was performed during the 6-second periods of the rich atmosphere (since NO does not exist in the test gas during these periods, the amount of NOx emission is plummeted). Further, during the subsequent 60-second periods of the lean atmosphere, it can be seen from FIG. 10, that NO tends to be gradually stored in the samples, and the storage of NO into the samples tends to be gradually saturated.

The rich spike refers to a rich combustion within a very short period of time, and can be reducing NOx stored in the NOx storage material.

FIG. 11 is an enlarged view of a portion of the graph illustrated in FIG. 10. It can be seen from FIG. 11 that the amount of NOx emission from the samples in Examples 1' to 3' are lower than the amount of NOx emission from the sample in Comparative Example 1'.

The reason for this is believed to be as follows: since the catalyst fine metal particles contain Rh and Pd, and Rh and Pd coexists at nano-level, Pd inhibited the oxidation of Rh, and thereby maintained the metallic state of Rh. Thus, the amount of NOx emission was reduced in the samples of Example 1' to 3', probably because of the NOx purification performance of the samples being maintained or improved and the samples being capable of sufficiently removing NOx.

In contrast, in the sample of Comparative Example 1', it is believed that the NOx purification performance of Rh was deteriorated due to the oxidation or the like of Rh, and the sample was unable to sufficiently purify NOx in the rich atmosphere. Thus, the unpurified NOx was probably emitted as it is, and resulted in an increased amount of NOx emission from the sample of Comparative Example 1', as compared to the amount of NOx emission from the samples of Example 1' to 3'.

Further, it can be seen from FIG. 11 that the peaks of the rich spikes are decreased in the order of from Example 1' to 3'. This is believed that the higher the Pd content in the fine composite-metal particles, the higher the inhibition of Rh oxidation by Pd.

Examples 4 to 11

Each of the samples (pellet type, diameter: 1 mm to 1.7 mm, 3 g) of the exhaust gas purification catalyst in Examples 4 to 11 was prepared in the same manner as the sample of exhaust gas purification catalyst in Example 2, other than, in the process of supporting the catalyst metals on the powdered support in Example 2, 16 g of a powdered support composed of $Al_2O_3$ and $CeO_2$ was used instead of $Al_2O_3$—$CeO_2$—$ZrO_2$, and that the calcined product was immersed in 11% by mass of a solution of barium acetate to support barium as a NOx storage material on the catalyst. The mass ratios of $Al_2O_3$ and $CeO_2$ contained in the powdered support contained in the samples of the exhaust gas purification catalyst in Examples 4 to 11 were 100:0, 90:10, 76:24, 71:29, 60:40, 50:50, 40:60, and 20:80, respectively.

Comparative Examples 4 to 11

Each of the samples (pellet type, diameter: 1 mm to 1.7 mm, 3 g) of the exhaust gas purification catalyst in Comparative Examples 4 to 11 was prepared in the same manner as the sample of exhaust gas purification catalyst in Comparative Example 1, other than, in the process of supporting the catalyst metals on the powdered support in Comparative Example 1, 16 g of a powdered support composed of $Al_2O_3$ and $CeO_2$ was used instead of $Al_2O_3$—$CeO_2$—$ZrO_2$, and that the calcined product was immersed in 11% by mass of a solution of barium acetate to support barium as a NOx storage material on the catalyst. The mass ratios of $Al_2O_3$ and $CeO_2$ contained in the powdered support contained in the samples of the exhaust gas purification catalyst in Comparative Examples 4 to 11 were 100:0, 90:10, 76:24, 71:29, 60:40, 50:50, 40:60, and 20:80, respectively.

<<Catalyst Evaluation B>>

Each of the samples of the exhaust gas purification catalyst in Examples 4 to 11 and Comparative Examples 4 to 11 was evaluated for its performance as a NOx storage-reduction catalyst, and the reduction temperature was evaluated by subjecting the samples of exhaust gas purification catalyst to temperature programmed reduction (TPR) technique.

<Performance Evaluation B as NOx Storage-Reduction Catalyst>

In the performance evaluation B as a NOx storage-reduction catalyst, a gas circulation type catalyst evaluation apparatus was used. In specific, a test gas was circulated through the catalyst evaluation apparatus, and the composition of the test gas after being brought into contact with each of the samples was measured, by using an infrared spectrometry (FT-IR).

The test gas was constituted by a lean atmosphere and a rich atmosphere. In the above mentioned evaluation, one cycle consisting of a 60-second period of the lean atmosphere and a 6-second period of the rich atmosphere was repeated 5 times, at a temperature of 400° C. Further, the flow velocity was set to 20 L/min, the space velocity of the test gas was set to 200,000 $h^{-1}$. The compositions of the lean atmosphere and the rich atmosphere of the test gas are shown in Table 4, and the results of the evaluation are illustrated in the following Table 5, FIG. 13 and FIG. 14.

Table 5 summarizes the details (the form of fine particles, the ratio of Rh to Pd, and the $CeO_2$ content in the powdered support) of the powdered support contained in the samples of the exhaust gas purification catalyst in Examples 4 to 11 and Comparative Examples 4 to 11; and summarizes the ratio of the amount of NOx emission to the amount of NOx storage (amount of NOx emission/amount of NOx storage). Note that, the "amount of NOx emission/amount of NOx storage" listed in Table 5 is an arithmetic mean value, obtained by selecting 2 to 4 cycles out of the above mentioned 5 cycles and by calculating the arithmetic mean of the values of the amount of NOx emission/amount of NOx storage in these cycles.

TABLE 4

| | Test gas | | | | | | |
|---|---|---|---|---|---|---|---|
| | NO (%) | $O_2$ (%) | $CO_2$ (%) | $H_2$ (%) | $C_3H_6$ (%) | CO (%) | $H_2O$ (%) | $N_2$ (%) |
| Lean | 0.04 | 7.0 | 10 | — | — | — | 4.0 | Balance |
| Rich | — | — | 10 | 1 | 0.06 | 3.0 | 4.0 | Balance |

TABLE 5

| | Form of Fine particles | Average ratio of the amount of Pd with respect to the total amount of Rh and Pd (% by atom) | $CeO_2$ content in the powdered support (% by mass) | Amount of NOx emission/ amount of NOx storage |
|---|---|---|---|---|
| Example 4 | Fine composite-metal particles | 16.5 | 0 | 0.12 |
| Comparative Example 4 | Rh fine particles | 0 | | 0.15 |
| Example 5 | Fine composite-metal particles | 16.5 | 10 | 0.12 |
| Comparative Example 5 | Rh fine particles | 0 | | 0.17 |
| Example 6 | Fine composite-metal particles | 16.5 | 24 | 0.13 |
| Comparative Example 6 | Rh fine particles | 0 | | 0.23 |
| Example 7 | Fine composite-metal particles | 16.5 | 29 | 0.14 |
| Comparative Example 7 | Rh fine particles | 0 | | 0.26 |
| Example 8 | Fine composite-metal particles | 16.5 | 40 | 0.20 |
| Comparative Example 8 | Rh fine particles | 0 | | 0.30 |
| Example 9 | Fine composite-metal particles | 16.5 | 50 | 0.29 |
| Comparative Example 9 | Rh fine particles | 0 | | 0.34 |
| Example 10 | Fine composite-metal particles | 16.5 | 60 | 0.37 |
| Comparative Example 10 | Rh fine particles | 0 | | 0.40 |
| Example 11 | Fine composite-metal particles | 16.5 | 80 | 0.47 |
| Comparative Example 11 | Rh fine particles | 0 | | 0.47 |

Figure 12:
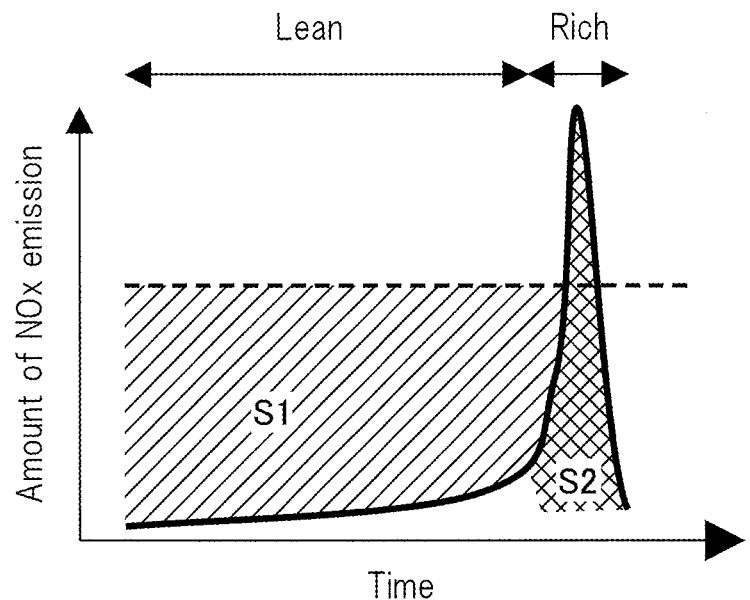
FIG. 12 is a schematic diagram illustrating one cycle consisting of a lean atmosphere period and a rich atmosphere period, of NOx storage and reduction cycles used in performance evaluation B as a NOx storage-reduction catalyst.

Referring now to FIG. 12, the "amount of NOx emission/amount of NOx storage" listed in Table 5 will be explained. FIG. 12 is a schematic diagram illustrating a NOx storage and reduction cycle consisting of a 60-second period of lean atmosphere and a 6-second period of rich atmosphere, with respect to the performance evaluation B as a NOx storage-reduction catalyst. In FIG. 12, the dotted line represents the NO content (constant) in the lean atmosphere before the contact with the sample of the exhaust gas purification catalyst; the region illustrated as "S1" represents the total amount of NOx stored in and/or adsorbed to the sample of exhaust gas purification catalyst (amount of NOx storage) in the lean atmosphere; and the region illustrated as "S2" (also referred to as NOx spike) represents the total amount of NOx emitted from the sample of the exhaust gas purification catalyst without being reduced (the amount of NOx emission) in the rich atmosphere. In other words, the above mentioned "amount of NOx emission/amount of NOx storage" corresponds to "S2/S1" in FIG. 12.

(Results of Performance Evaluation B as NOx Storage-Reduction Catalyst)

Figure 13:
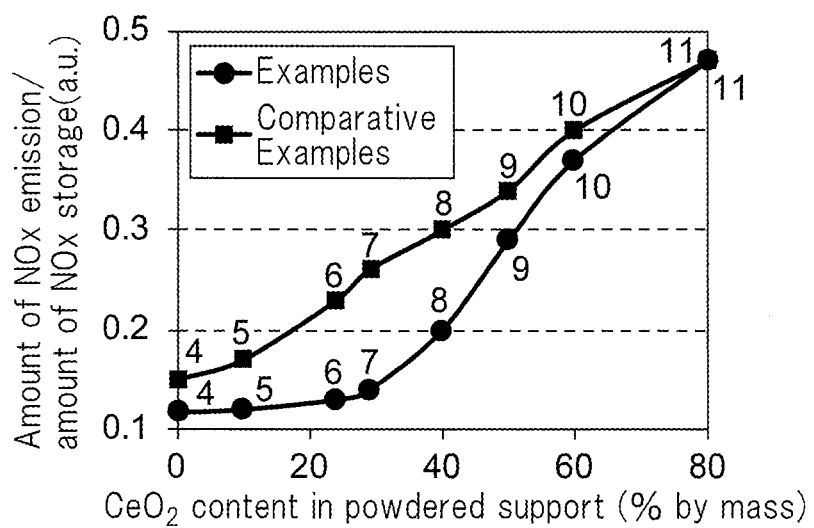
FIG. 13 is a graph illustrating the relationship between the $CeO_2$ content (% by mass) in the powdered support, and the amount of NOx emission/amount of NOx storage (a.u.), of the samples of the exhaust gas purification catalyst in Examples 4 to 11 (circles) and Comparative Examples 4 to 11 (squares).

FIG. 13 is a graph illustrating the relationship between the $CeO_2$ content (% by mass) in the powdered support, and the amount of NOx emission/amount of NOx storage (a.u.), of the samples of the exhaust gas purification catalyst in Examples 4 to 11 (circles) and Comparative Examples 4 to 11 (squares). Table 5 may also be referred to, with respect to the relationship between the $CeO_2$ content (% by mass) in the powdered support and the amount of NOx emission/amount of NOx storage (a.u.).

It can be seen from FIG. 13 that, in the samples of exhaust gas purification catalyst in Comparative Examples 4 to 11 (squares), as the $CeO_2$ content in the powdered support is increased, the value of the amount of NOx emission/amount of NOx storage is linearly increased. This is believed that, as the $CeO_2$ content in the powdered support is increased, the inhibition of the reduction of Rh oxide by $CeO_2$ is also increased, and in addition, the reducing agent such as hydrocarbon or the like is consumed by the oxygen released from $CeO_2$.

Further, it can be seen from FIG. 13 that, with respect to the samples of the exhaust gas purification catalyst in Examples 4 to 7 (circles), when the values of the $CeO_2$ content in the powdered support are in the range of from more than 0% by mass and 29% or less, the values of the amount of NOx emission/amount of NOx storage are small, and almost the same. This is believed that since Pd is capable of inhibiting the oxidation of Rh in the fine composite-metal particles containing Rh and Pd, the oxidation of Rh by $CeO_2$ was inhibited in the rich atmosphere, and whereby a large portion of the NOx stored in the samples was purified.

FIG. 13 also indicates that, in the samples of the exhaust gas purification catalyst in Examples 8 to 11 (circles), as the $CeO_2$ content in the powdered support is increased in the range of from 40% by mass to 80% by mass, the value of the amount of NOx emission/amount of NOx storage is linearly increased. However, it is understood from FIG. 13 that, upon comparing the values of the amount of NOx emission/amount of NOx storage of the catalysts in: Example 8 with Comparative Example 8; Example 9 with Comparative Example 9; Example 10 with Comparative Example 10; and Example 11 with Comparative Example 11, respectively, the values of the amount of NOx emission/amount of NOx storage of the catalysts in Examples are smaller than those in Comparative Examples in all of the above mentioned combinations for comparison. When the value of the amount of NOx emission/amount of NOx storage is small, it means that a large portion of NOx stored in the exhaust gas purification catalyst has been purified.

Figure 14:
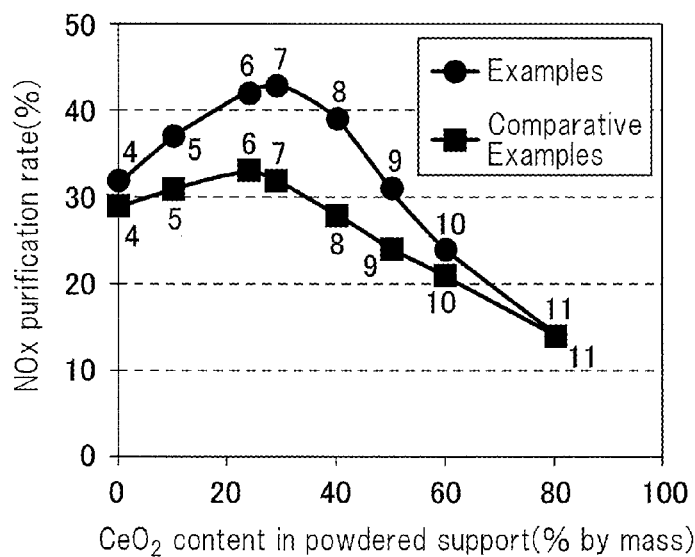
FIG. 14 is a graph illustrating the relationship between the $CeO_2$ content (% by mass) in the powdered support and the NOx purification rate (%) of the samples of the exhaust gas purification catalyst in Examples 4 to 11 (circles) and Comparative Examples 4 to 11 (squares).

FIG. 14 is a graph illustrating the relationship between the $CeO_2$ content (% by mass) in the powdered support and the NOx purification rate (%) of the samples of the exhaust gas purification catalyst, in Examples 4 to 11 (circles) and in Comparative Examples 4 to 11 (squares).

It can be seen from FIG. 14 that, when the exhaust gas purification catalysts in Examples and Comparative Examples having the same $CeO_2$ content in the powdered support are compared to each other (for example, when compared in the combination of Example 7 and Comparative Example 7), the NOx purification rate of the exhaust gas purification catalyst in each of the Examples is higher than the NOx purification rate of the exhaust gas purification catalyst in each of the Comparative Examples.

Further, it can be seen from the curve of Examples, illustrated in FIG. 14, that particularly high NOx purification rates are achieved, when the $CeO_2$ contents in the powdered support are in the range of from more than 0% by mass (Example 4) and 40% by mass (Example 8) or less. This is believed that, in the exhaust gas purification catalysts including the combination of the fine composite-metal particles and $CeO_2$, the amount of NOx adsorption was improved in the lean atmosphere, and at the same time, the catalyst activity of Rh was improved in the rich atmosphere.

<Evaluation B of Reduction Temperature>

Figure 16:
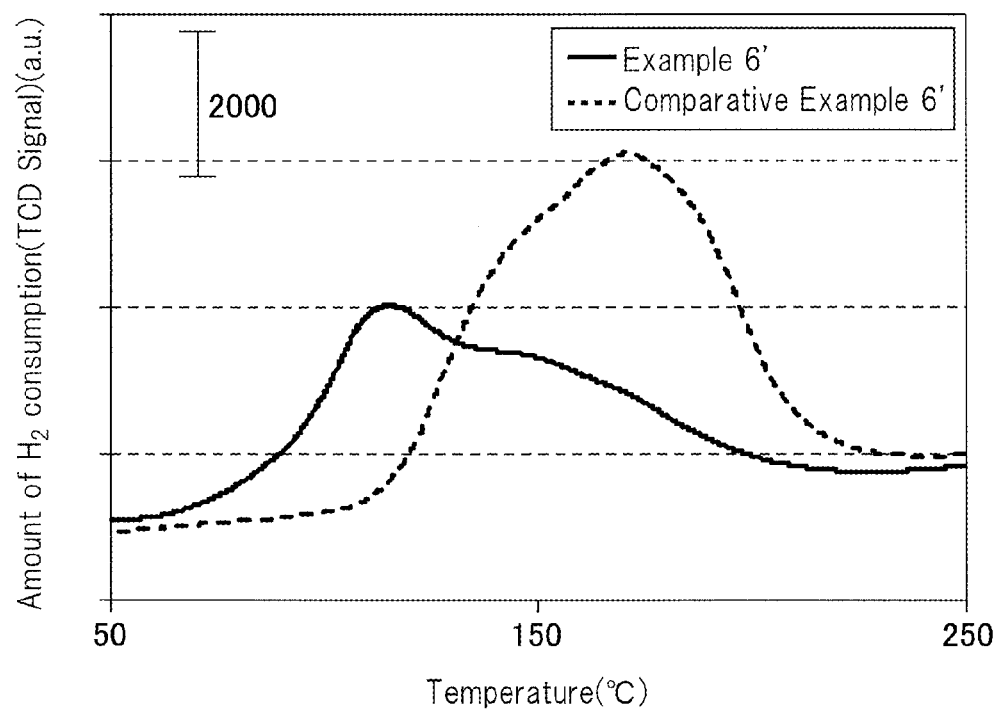
FIG. 16 is a graph illustrating the relationship between the temperature (° C.) and the amount of $H_2$ consumption (TCD signal) (a.u.) of the samples of the exhaust gas purification catalyst in Example 6' (solid line) and Comparative Example 6' (dotted line), when the samples were subjected to the temperature programmed reduction technique.

The evaluation of the reduction temperature was carried out, and the results are shown in FIG. 16.

The evaluation of reduction temperature was carried out, in specific, by performing the following procedures (1) to (6) in the order listed below.

(1) A quantity of 50 mg of a sample of the exhaust gas purification catalyst is introduced into a sample tube.

(2) The evaluation apparatus is configured such that a gas generator, the sample tube, a desiccant, and a thermal conductivity detector are arranged in this order (TCD: Thermal Conductivity Detector).

(3) A gas composed of 10 vol % of $O_2$ and 90 vol % of helium is allowed to circulate from the gas generator to the sample tube at 30 mL/min, and the temperature of the gas is increased to 500° C. at a temperature rise rate of 20° C./min.

(4) After the temperature of the gas reached 500° C., the temperature is maintained for 10 minutes, and the temperature of the gas is then cooled to 50° C.

(5) A gas composed of 100 vol % of Ar is allowed to circulate from the gas generator to the sample tube.

(6) A gas composed of 1 vol % of $H_2$ and 99 vol % of Ar is allowed to circulate from the gas generator to the sample tube at 30 mL/min, and the temperature of the gas is increased to 500° C. at a temperature rise rate of 10° C./min.

It is noted that the role of the desiccant in the above mentioned (2) is to trap water contained in the gas which has passed through the sample tube. The thermal conductivity detector (TCD) is an apparatus for measuring the changes in the thermal conductivity of the gas associated with the changes in the gas composition, and thereby calculating the concentration of the gas.

Further, in the above mentioned (1), each of the samples of the exhaust gas purification catalyst in Example 6' and Comparative Example 6' were used. The samples in Example 6' and Comparative Example 6' were prepared in the same manner as those in Example 6 and Comparative Example 6, other than the process for supporting barium as a NOx storage material on the catalyst was not carried out.

Figure 15:
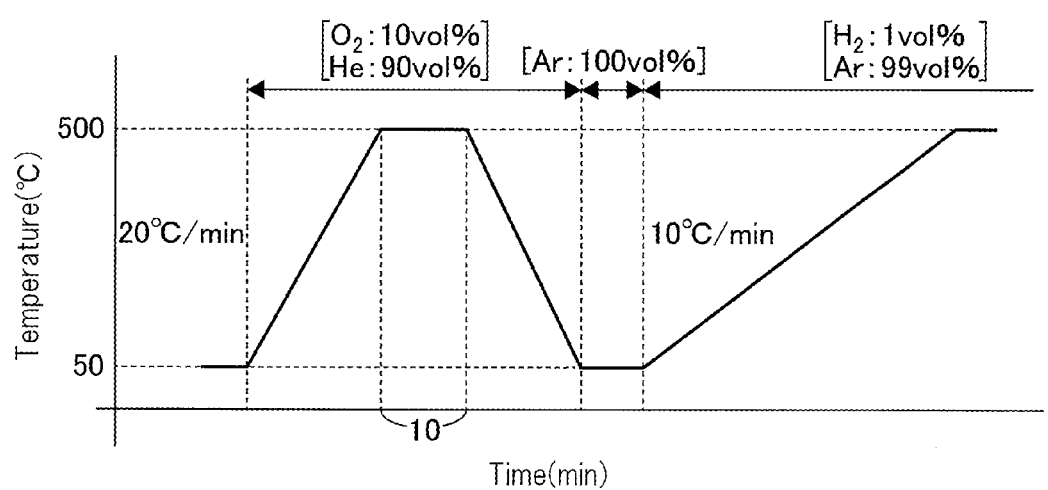
FIG. 15 is a graph illustrating the relationship between the time and the temperature regarding the conditions for evaluating catalysts by temperature programmed reduction (TPR) technique.

A series of flow of the above mentioned procedures (1) to (6) are illustrated in FIG. 15.

(Results of Evaluation B of Reduction Temperature)

FIG. 16 is a graph illustrating the relationship between the temperature (° C.) and the amount of $H_2$ consumption (TCD signal) (a.u.) of the samples of the exhaust gas purification catalyst in Example 6' and Comparative Example 6', when the samples were subjected to the temperature programmed reduction (TPR) technique.

In FIG. 16, the solid line represents the sample of the exhaust gas purification catalyst in Example 6', and the dotted line represents the sample of the exhaust gas purification catalyst in Comparative Example 6'. It can be seen from FIG. 16 that the temperature corresponding to the peak of the amount of $H_2$ consumption of the sample in Example 6' is about 115° C., and the temperature corresponding to the peak of the amount of $H_2$ consumption of the sample in Comparative Example 6' is about 170° C. Accordingly, it is understood that the transition from oxide to metal of the fine composite-metal particles included in the exhaust gas purification catalyst in Example 6', in particular, of Rh contained in the fine particles, occurs at lower temperature.

This is believed that, since Rh and Pd coexist at nano-level within the fine composite-metal particles, the effect of Pd to inhibit the oxidation of Rh is markedly exhibited.

While preferred embodiments of the present invention have been described in detail, those skilled in the art will recognize that the manufacturer, grade, quality and the like of the apparatuses, equipment, chemicals and the like to be used in the present invention can be changed without departing from the scope of the claims.

What is claimed is:

1. An exhaust gas purification catalyst comprising fine composite-metal particles containing Rh and Pd;
   wherein, when the fine composite-metal particles in the exhaust gas purification catalyst are analyzed by STEM-EDX, the average ratio of the amount of Pd with respect to the total amount of Rh and Pd in the fine composite-metal particles is 1.7 atomic % or more and 24.8 atomic % or less; and
   wherein the average ratio is a value calculated by selecting 10 or more fine particles from the exhaust gas purification catalyst at random; measuring each of all the selected fine particles by STEM-EDX; further selecting all the fine composite-metal particles containing Rh and Pd from all of the randomly selected fine particles; totaling the values of the ratio of the amount of Pd with respect to the total amount of Rh and Pd in each of the fine composite-metal particles; and dividing the total values of the ratio by the total number of the selected fine composite-metal particles.

2. The exhaust gas purification catalyst according to claim 1, further comprising a powdered support, wherein the fine composite-metal particles are supported on the powdered support.

3. The exhaust gas purification catalyst according to claim 2, wherein the powdered support is a powdered support selected from the group consisting of $SiO_2$, MgO, $ZrO_2$, $CeO_2$, $Al_2O_3$, $TiO_2$, solid solutions thereof, and combinations thereof.

4. The exhaust gas purification catalyst according to claim 2, wherein the powdered support contains $CeO_2$ in an amount of more than 0% by mass and 40% by mass or less with respect to the mass of the powdered support.

5. The exhaust gas purification catalyst according to claim 1, wherein the average ratio is 2 atomic % or more and 20 atomic % or less.

6. The exhaust gas purification catalyst according to claim 1, wherein the average ratio is 3 atomic % or more and 15 atomic % or less.

7. The exhaust gas purification catalyst according to claim 1, wherein the average ratio is 4 atomic % or more and 15 atomic % or less.

8. The exhaust gas purification catalyst according to claim 1, wherein the average ratio is 5 atomic % or more and 13 atomic % or less.

9. The exhaust gas purification catalyst according to claim 1, wherein the average ratio is 1.7 atomic % or more and 10 atomic % or less.

10. The exhaust gas purification catalyst according to claim 1, wherein the average ratio is 1.7 atomic % or more and 8 atomic % or less.

11. The exhaust gas purification catalyst according to claim 1, wherein the average ratio is 1.7 atomic % or more and 6 atomic % or less.

12. A method for purifying exhaust gas, wherein the exhaust gas purification catalyst according to claim 1 is brought into contact with an exhaust gas containing HC, CO and NOx, in a stoichiometric atmosphere, and thereby oxidizing HC and CO, and reducing NOx, to purify the exhaust gas.

13. A method for purifying exhaust gas, wherein the exhaust gas purification catalyst according to claim 1 is brought into contact with an exhaust gas containing NOx in a lean atmosphere, and the NOx is reduced in a rich atmosphere, to purify the exhaust gas.

* * * * *